US011913454B2

(12) United States Patent
Suzuki et al.

(10) Patent No.: US 11,913,454 B2
(45) Date of Patent: Feb. 27, 2024

(54) SLIDING COMPONENT

(71) Applicant: EAGLE INDUSTRY CO., LTD., Tokyo (JP)

(72) Inventors: Hiroshi Suzuki, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/012,853

(22) PCT Filed: Jul. 1, 2021

(86) PCT No.: PCT/JP2021/024940
§ 371 (c)(1),
(2) Date: Dec. 23, 2022

(87) PCT Pub. No.: WO2022/009767
PCT Pub. Date: Jan. 13, 2022

(65) Prior Publication Data
US 2023/0258182 A1    Aug. 17, 2023

(30) Foreign Application Priority Data
Jul. 6, 2020    (JP) .................................. 2020-116356

(51) Int. Cl.
*F04C 29/00* (2006.01)
*F04C 18/02* (2006.01)
(Continued)

(52) U.S. Cl.
CPC .......... *F04C 29/0021* (2013.01); *F04C 18/02* (2013.01); *F04C 18/0215* (2013.01);
(Continued)

(58) Field of Classification Search
CPC ................ F16C 17/045; F16C 33/1015; F16C 33/1065; F16C 33/107; F16C 2360/42;
(Continued)

(56) References Cited

U.S. PATENT DOCUMENTS 3,380,040 A    4/1968  Liggett ................. F16C 17/045
3,383,116 A    5/1968  Carter ............................ 277/96
(Continued)

FOREIGN PATENT DOCUMENTS

CN    1245552    2/2000    ............... F16J 15/34
CN    2460801    11/2001   ............... F16J 15/40
(Continued)

OTHER PUBLICATIONS

International Search Report and Written Opinion issued in PCT/JP2021/024940, dated Aug. 10, 2021, with English translation, 13 pages.

(Continued)

*Primary Examiner* — Mark A Laurenzi
*Assistant Examiner* — Xiaoting Hu
(74) *Attorney, Agent, or Firm* — HAYES SOLOWAY P.C.

(57) ABSTRACT

A sliding component has an annular shape with a fluid facing inside and outside of the sliding component and has a sliding surface relatively sliding with eccentric rotation, in which the sliding surface includes a land and a plurality of dynamic pressure generation mechanisms arranged in a circumferential direction, the dynamic pressure generation mechanism includes a shallow groove portion and a deep groove portion, the shallow groove portion communicates with the deep groove portion, and a communication passage providing a communication between the deep groove portion and either an inside space or an outside space of the sliding component is formed in the sliding component.

13 Claims, 14 Drawing Sheets

(51) Int. Cl.
*F04C 27/00* (2006.01)
*F04C 29/02* (2006.01)
*F16C 17/04* (2006.01)

(52) U.S. Cl.
CPC ............ *F04C 27/008* (2013.01); *F04C 29/00* (2013.01); *F16C 17/045* (2013.01); *F04C 29/028* (2013.01); *F04C 2240/50* (2013.01); *F04C 2240/54* (2013.01); *F04C 2240/801* (2013.01); *F16C 2360/42* (2013.01)

(58) Field of Classification Search
CPC .. F16C 32/0659; F16C 2360/00; F16C 17/04; F16C 17/08; F04C 18/02–0292; F04C 2/02–025; F04C 2240/54; F04C 2240/50; F04C 2240/801; F04C 27/005; F04C 27/008; F04C 29/0021; F04C 15/0023; F04C 15/0034; F04C 15/0042; F01C 1/02–0292; F01C 21/02; F01C 19/08; F01C 19/12
See application file for complete search history.

(56) References Cited

U.S. PATENT DOCUMENTS

| | | | |
|---|---|---|---|
| 3,527,465 A | 9/1970 | Guinard | |
| 3,675,935 A | 7/1972 | Ludwig | F16J 15/342 |
| 3,704,019 A | 11/1972 | McHugh | 277/400 |
| 3,782,737 A | 1/1974 | Ludwig et al. | 277/27 |
| 4,056,478 A | 11/1977 | Capelli | C01M 5/00 |
| 4,071,253 A | 1/1978 | Heinen et al. | 277/3 |
| 4,523,764 A | 6/1985 | Albers et al. | 277/3 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A | 12/1992 | Lahrman | 277/400 |
| 5,180,173 A | 1/1993 | Kimura et al. | |
| 5,224,714 A | 7/1993 | Kimura | 277/400 |
| 5,316,455 A * | 5/1994 | Yoshimura | F04C 29/0021 418/94 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,667 B2 | 2/2017 | Takahashi et al. | F16J 15/3412 |
| 9,772,037 B2 | 9/2017 | Itadani et al. | F16J 15/3412 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/342 |
| 10,865,883 B2 | 12/2020 | Seki et al. | F16J 15/3404 |
| 11,248,706 B2 | 2/2022 | Imura | F16C 33/74 |
| 11,320,052 B2 | 5/2022 | Imura et al. | F16J 15/34 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0135957 A1 | 6/2005 | Park | F04C 18/0215 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0050260 A1 | 2/2008 | Iwanami et al. | 418/55.6 |
| 2008/0100001 A1 | 5/2008 | Flaherty | |
| 2009/0200749 A1 | 8/2009 | Teshima | F16J 15/3484 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3484 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1* | 8/2013 | Tokunaga | F16C 33/74 384/123 |
| 2013/0323105 A1 | 12/2013 | Chao et al. | F04C 29/028 |
| 2014/0159314 A1 | 6/2014 | Hosoe | F16J 15/34 |
| 2014/0197600 A1 | 7/2014 | Hosoe | F16J 15/342 |
| 2014/0217676 A1 | 8/2014 | Hosoe et al. | 277/350 |
| 2014/0319776 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0345642 A1 | 12/2015 | Haas | F16J 15/3496 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/3412 |
| 2017/0146014 A1 | 5/2017 | Ohta et al. | F04C 29/0021 |
| 2017/0241549 A1 | 8/2017 | Itadani | F16C 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0299015 A1 | 10/2018 | Itadani | F16J 15/3448 |
| 2019/0169988 A1 | 6/2019 | Tokunaga et al. | F01C 19/12 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0141444 A1* | 5/2020 | Thatte | F16C 17/08 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0364034 A1 | 11/2021 | Okada | F16J 15/342 |
| 2022/0056949 A1 | 2/2022 | Ikeda et al. | F16C 17/04 |
| 2023/0027772 A1 | 1/2023 | Suzuki et al. | F16C 17/02 |
| 2023/0258182 A1 | 8/2023 | Suzuki | F04C 18/0215 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |

(56) References Cited

FOREIGN PATENT DOCUMENTS

| | | | |
|---|---|---|---|
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 109237042 | 1/2019 | F16J 15/34 |
| CN | 110770456 | 2/2020 | F16C 33/12 |
| CN | 110925426 | 3/2020 | F16J 15/16 |
| CN | 111656065 | 9/2020 | F16J 15/34 |
| DE | 3223703 | 6/1982 | F16J 15/34 |
| DE | 102008038396 | 2/2010 | |
| EP | 0369295 | 11/1988 | F16J 15/34 |
| EP | 0518681 | 12/1992 | G11B 15/60 |
| EP | 0637706 | 8/1993 | F16J 15/34 |
| EP | 2138225 | 12/2009 | B01J 13/20 |
| EP | 2754931 | 7/2014 | F16J 15/34 |
| EP | 3112078 | 1/2017 | B23K 26/364 |
| EP | 3196516 | 7/2017 | F16J 15/34 |
| EP | 3217049 | 9/2017 | F16J 15/34 |
| EP | 3396186 | 10/2018 | F16C 33/10 |
| EP | 3575621 | 12/2019 | F16C 33/10 |
| EP | 3575643 | 12/2019 | F16J 15/34 |
| EP | 3650722 | 5/2020 | F16C 33/12 |
| FR | 2342440 | 9/1997 | F16J 15/34 |
| GB | 1509482 | 5/1978 | F16C 33/10 |
| GB | 2263952 | 8/1993 | F16J 15/34 |
| JP | S51-034974 | 3/1976 | |
| JP | S52-143571 | 10/1977 | F16J 15/26 |
| JP | 57163770 | 10/1982 | F16J 15/3412 |
| JP | S59-195253 | 12/1984 | F16J 15/34 |
| JP | S59-195254 | 12/1984 | F16J 15/34 |
| JP | S61-8402 | 1/1986 | F01C 1/01 |
| JP | S63-134883 | 6/1988 | F04C 18/02 |
| JP | S63-190975 | 8/1988 | F16J 15/34 |
| JP | H02-16381 | 1/1990 | F04C 18/02 |
| JP | H02-236067 | 9/1990 | F16J 15/34 |
| JP | H02-136863 | 11/1990 | F16J 15/34 |
| JP | H04-50559 | 2/1992 | F16J 15/34 |
| JP | H04-337165 | 11/1992 | F16J 15/34 |
| JP | H04-362289 | 12/1992 | F04C 18/02 |
| JP | H05-60247 | 3/1993 | F16J 15/34 |
| JP | H05-296248 | 11/1993 | |
| JP | H05-90049 | 12/1993 | F16J 15/34 |
| JP | H06-17941 | 1/1994 | F16J 15/34 |
| JP | H06-117547 | 4/1994 | F16J 15/34 |
| JP | H06-174107 | 6/1994 | F16J 15/34 |
| JP | H06-323442 | 11/1994 | F16J 15/34 |
| JP | H06-105105 | 12/1994 | F16J 15/34 |
| JP | H07-43038 | 5/1995 | F16J 15/34 |
| JP | 9-89119 | 3/1997 | F16J 15/34 |
| JP | 9-292034 | 11/1997 | F16J 15/34 |
| JP | H10-281299 | 10/1998 | F16J 15/34 |
| JP | H10-292867 | 11/1998 | |
| JP | H10-339286 | 12/1998 | F04C 18/02 |
| JP | H11-132163 | 5/1999 | F04C 18/02 |
| JP | H11-287329 | 10/1999 | F16J 15/34 |
| JP | H11-303858 | 11/1999 | F16C 17/10 |
| JP | 3066367 | 5/2000 | F16J 15/34 |
| JP | 2001-12458 | 1/2001 | F16C 17/10 |
| JP | 2003-343730 | 12/2003 | F16J 15/22 |
| JP | 2004-360903 | 12/2004 | F16J 15/447 |
| JP | 2005-155894 | 6/2005 | F16C 17/04 |
| JP | 2005-180652 | 7/2005 | F16J 15/34 |
| JP | 2005-315391 | 11/2005 | |
| JP | 2005-337503 | 12/2005 | F16J 15/34 |
| JP | 2006-9614 | 1/2006 | F04C 18/08 |
| JP | 2006-77899 | 3/2006 | F16J 15/34 |
| JP | 2006-90524 | 4/2006 | F16C 17/02 |
| JP | 2006-183702 | 7/2006 | F16C 17/04 |
| JP | 2006-316677 | 11/2006 | F04C 18/02 |
| JP | 2007-162045 | 6/2007 | |
| JP | 2008-51018 | 3/2008 | F04C 18/02 |
| JP | 2008-51030 | 3/2008 | F04C 18/02 |
| JP | 2008-106940 | 5/2008 | F16J 15/34 |
| JP | 2011-74931 | 4/2011 | F16J 15/34 |
| JP | 2011-185292 | 9/2011 | F16J 15/34 |
| JP | 2012-2295 | 1/2012 | F16J 15/34 |
| JP | 2012-062534 | 3/2012 | |
| JP | 2012-82794 | 4/2012 | F04C 18/02 |
| JP | 2012-122135 | 6/2012 | C25D 15/02 |
| JP | 2013-167216 | 8/2013 | F04C 18/02 |
| JP | 2013-213545 | 10/2013 | F16C 32/06 |
| JP | 2014-529052 | 10/2014 | |
| JP | 2015-063647 | 4/2015 | |
| JP | 2015-68330 | 4/2015 | F04C 29/00 |
| JP | 5693599 | 4/2015 | |
| JP | 2015-183631 | 10/2015 | F04C 2/10 |
| JP | 2016-61208 | 4/2016 | F04C 18/02 |
| JP | 2016-80090 | 5/2016 | F16J 15/34 |
| JP | 5960145 | 7/2016 | F16J 15/34 |
| WO | WO2006051702 | 5/2006 | F16J 15/34 |
| WO | WO2011115073 | 9/2011 | F16J 15/34 |
| WO | WO2012046749 | 4/2012 | F16J 15/34 |
| WO | WO2013035503 | 3/2013 | F16J 15/34 |
| WO | WO2013053411 | 4/2013 | |
| WO | WO2014061544 | 4/2014 | |
| WO | WO2014148316 | 9/2014 | F16J 15/34 |
| WO | WO2014148317 | 9/2014 | F16J 15/34 |
| WO | WO2014174725 | 10/2014 | F16J 15/34 |
| WO | WO2015111707 | 7/2015 | F16J 15/18 |
| WO | WO2016035860 | 3/2016 | F16J 15/34 |
| WO | WO2016167262 | 10/2016 | F16J 15/34 |
| WO | WO2016186015 | 11/2016 | F16J 15/34 |
| WO | WO2016186019 | 11/2016 | F16J 15/34 |
| WO | WO2016186020 | 11/2016 | F16J 15/34 |
| WO | WO2016203878 | 12/2016 | F16J 15/34 |
| WO | WO2017002774 | 1/2017 | F16J 15/34 |
| WO | WO2017061406 | 4/2017 | F16J 15/34 |
| WO | WO2018025629 | 2/2018 | F02B 55/02 |
| WO | WO2018092742 | 5/2018 | F16J 15/34 |
| WO | WO2018105505 | 6/2018 | F16J 33/12 |
| WO | WO2018139231 | 8/2018 | F16J 15/34 |
| WO | WO2020129846 | 6/2020 | F16C 17/04 |
| WO | WO2021125201 | 6/2021 | F16J 15/18 |

OTHER PUBLICATIONS

International Preliminary Report on Patentability issued in PCT/JP2021/024940, dated Jan. 10, 2023, 4 pages.
International Search Report and Written Opinion issued in PCT/JP2021/024941, dated Sep. 14, 2021, with English translation, 13 pages.
International Preliminary Report on Patentability issued in PCT/JP2021/024941, dated Jan. 10, 2023, 5 pages.
International Search Report and Written Opinion issued in PCT/JP2021/024938, dated Aug. 3, 2021, with English translation, 12 pages.
International Preliminary Report on Patentability issued in PCT/JP2021/024938, dated Jan. 10, 2023, 4 pages.
International Search Report and Written Opinion issued in PCT/JP2021/024945, dated Sep. 7, 2021, with English translation, 16 pages.
International Preliminary Report on Patentability issued in PCT/JP2021/024945, dated Jan. 10, 2023, 6 pages.
International Search Report and Written Opinion issued in PCT/JP2021/024943, dated Sep. 7, 2021, with English translation, 13 pages.
International Preliminary Report on Patentability issued in PCT/JP2021/024943, dated Jan. 10, 2023, 5 pages.
International Search Report and Written Opinion issued in PCT/JP2021/024944, dated Jul. 27, 2021, with English translation, 11 pages.

(56) References Cited

OTHER PUBLICATIONS

International Preliminary Report on Patentability issued in PCT/JP2021/024944, dated Jan. 10, 2023, 4 pages.
U.S. Appl. No. 18/012,856, filed Dec. 23, 2022, Suzuki.
U.S. Appl. No. 18/012,857, filed Dec. 23, 2022, Suzuki.
U.S. Appl. No. 18/013,513, filed Dec. 28, 2022, Suzuki.
U.S. Appl. No. 18/013,515, filed Dec. 28, 2022, Suzuki.
U.S. Appl. No. 18/013,520, filed Dec. 28, 2022, Suzuki.
Official Action issued in related U.S. Appl. No. 18/012,857, dated Oct. 5, 2023, 11 pages.

* cited by examiner

SLIDING COMPONENT

TECHNICAL FIELD

The present invention relates to a sliding component used in a rotating machine including an eccentric mechanism.

BACKGROUND ART

Machines entailing rotational driving and used in various industrial fields include not only a rotating machine rotating with its central axis held at a fixed position but also a rotating machine rotating with its central axis entailing eccentricity. The rotating machine rotating with eccentricity is, for example, a scroll compressor. This type of compressor is provided with, for example, a scroll compression mechanism including a fixed scroll having a spiral lap on the surface of an end plate and a movable scroll having a spiral lap on the surface of an end plate and an eccentric mechanism eccentrically rotating a rotary shaft. By the rotary shaft rotating, the movable scroll is slid relative to the fixed scroll with eccentric rotation. As a result, in this mechanism, the fluid supplied from the low-pressure chamber on the outer diameter side of the two scrolls is pressurized and a high-pressure fluid is discharged from the discharge hole formed in the middle of the fixed scroll.

These scroll compressors using the mechanism in which the movable scroll is slid relative to the fixed scroll with eccentric rotation are widely used in, for example, refrigeration cycles because the compressors are highly efficient in terms of compression and cause little noise. However, the compressors are problematic in that a fluid leaks from the axial gap between the two scrolls. The scroll compressor described in Patent Citation 1 includes a thrust plate sliding relative to a movable scroll on the back surface side of the movable scroll. A part of a refrigerant compressed by a scroll compression mechanism is supplied to the back pressure chamber formed on the back surface side of the thrust plate, and the movable scroll is pressed toward a fixed scroll. As a result, it is possible to reduce the leakage of the refrigerant from the axial gap between the two scrolls when the refrigerant is compressed.

CITATION LIST

Patent Literature

Patent Citation 1: JP 2016-61208 A (Pages 5 to 6, FIG. 1)

SUMMARY OF INVENTION

Technical Problem

In the scroll compressor described in Patent Citation 1, a part of the refrigerant compressed by the scroll compression mechanism is used to press the movable scroll from the back surface side toward the fixed scroll via the thrust plate. Accordingly, although the refrigerant leakage from the inter-scroll axial gap can be reduced, a pressing force acts from both axial sides between the two scrolls, especially on the sliding surface that entails the eccentric rotation between the movable scroll and the thrust plate. As a result, there is a problem that an increase in frictional resistance occurs, a smooth operation of the movable scroll is hindered, and the efficiency of compression cannot be enhanced.

The present invention has been made in view of such a problem, and an object of the present invention is to provide a sliding component capable of stably reducing the frictional resistance of a sliding surface entailing eccentric rotation.

Solution to Problem

In order to solve the above problem, a sliding component according to the present invention has an annular shape with a fluid facing inside and outside of the sliding component and has a sliding surface relatively sliding with eccentric rotation. The sliding surface includes a land and a plurality of dynamic pressure generation mechanisms arranged in a circumferential direction. The dynamic pressure generation mechanism includes a shallow groove portion and a deep groove portion deeper than the shallow groove portion. The shallow groove portion communicates with the deep groove portion. A communication passage providing a communication between the deep groove portion and either an inside space or an outside space of the sliding component is formed in the sliding component. According to the aforesaid feature of the present invention, a fluid is always supplied to the deep groove portion through the communication passage, and the fluid stored in the deep groove portion is stably supplied into the shallow groove portion in accordance with the direction of the relative movement of the shallow groove portion entailed by eccentric rotation. Accordingly, dynamic pressure is generated in the shallow groove portion and the sliding surfaces are slightly separated from each other. As a result, a fluid film is formed between the sliding surfaces, not only can lubricity be improved, but also the occurrence of cavitation can be suppressed. In this manner, the frictional resistance of the sliding surfaces during sliding can be stably reduced.

It may be preferable that the communication passage communicates with the shallow groove portion. According to this preferable configuration, a fluid can be supplied through the communication passage into the shallow groove portion as well, and thus the lubricity between the sliding surfaces can be further improved.

It may be preferable that in a plan view parallel to the sliding surface, an area of the deep groove portion is larger than an area of the communication passage. According to this preferable configuration, a sufficient storage amount can be ensured in the deep groove portion.

It may be preferable that the shallow groove portion surrounds the deep groove portion in an annular shape. According to this preferable configuration, dynamic pressure can be generated at any position in the shallow groove portion in accordance with the direction of the relative movement of the shallow groove portion entailed by eccentric rotation.

It may be preferable that the communication passage is a groove formed in the sliding surface. According to this preferable configuration, a fluid is supplied between the sliding surfaces also from the communication passage, and thus the lubricity between the sliding surfaces can be improved.

It may be preferable that the communication passage is a communication hole formed in the sliding component. According to this preferable configuration, the fluid in either the inside space or the outside space can be stably supplied to the deep groove portion through the communication passage without being affected by the sliding surface.

It may be preferable that the shallow groove portion surrounds an entire circumference of the deep groove portion. According to this preferable configuration, dynamic pressure can be generated at any position over the entire circumference in the shallow groove portion in accordance with the direction of the relative movement of the shallow groove portion entailed by eccentric rotation.

DESCRIPTION OF EMBODIMENTS

Figure 1:
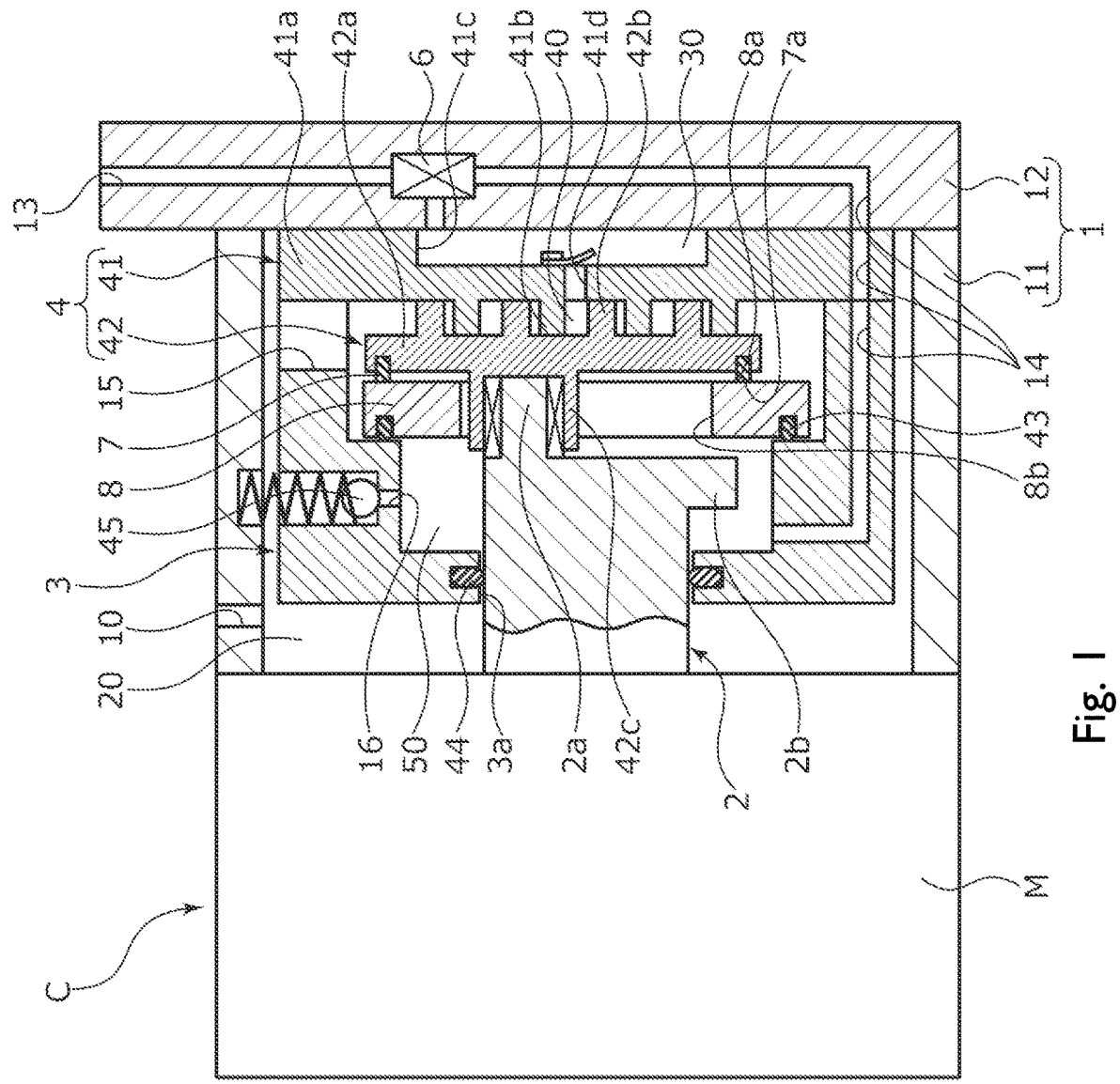
FIG. 1 is a schematic configuration diagram illustrating a scroll compressor to which a side seal as a sliding component according to a first embodiment of the present invention is applied.

Modes for implementing the sliding component according to the present invention will be described below based on embodiments.

First Embodiment

The sliding component according to a first embodiment of the present invention will be described with reference to FIGS. 1 to 9. In the drawings, the groove formed in the sliding surface of the sliding component or the like is dotted for convenience of description.

The sliding component according to the first embodiment of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking one opening of the casing 11. Formed in the casing 11 are a low-pressure chamber 20, a high-pressure chamber 30, and a back pressure chamber 50. A low-pressure refrigerant is supplied from a refrigerant circuit (not illustrated) to the low-pressure chamber 20 through a suction port 10. A high-pressure refrigerant compressed by the scroll compression mechanism 4 is discharged to the high-pressure chamber 30. A part of the refrigerant compressed by the scroll compression mechanism 4 is supplied, together with lubricating oil, to the back pressure chamber 50. It should be noted that the back pressure chamber 50 is formed in the cylindrical inner casing 3 accommodated in the casing 11.

Formed in the cover 12 is a discharge communication passage 13 for communication between the refrigerant circuit (not illustrated) and the high-pressure chamber 30. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with one end of the inner casing 3 abutting against an end plate 41a of a fixed scroll 41 constituting the scroll compression mechanism 4. In addition, in one end portion of the inner casing 3, a suction communication passage 15 penetrating it in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 and a movable scroll 42. The fixed scroll 41 is fixed to the cover 12 in a substantially sealed shape. The movable scroll 42 is accommodated in the inner casing 3.

The fixed scroll 41 is made of metal and includes a spiral lap 41b projecting from the surface of the disk-shaped end plate 41a, that is, one end surface of the end plate 41a. In addition, a recessed portion 41c recessed on the inner diameter side of the back surface of the end plate 41a, that is, the other end surface of the end plate 41a is formed in the fixed scroll 41. The high-pressure chamber 30 is defined from the recessed portion 41c and the end surface of the cover 12.

The movable scroll 42 is made of metal and includes a spiral lap 42b projecting from the surface of a disk-shaped end plate 42a, that is, one end surface of the end plate 42a. In addition, a boss 42c protruding from the middle of the back surface of the end plate 42a, that is, the other end surface of the end plate 42a is formed on the movable scroll 42. An eccentric portion 2a formed in one end portion of the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from one end portion of the rotary shaft 2 in the present embodiment.

When the rotary shaft 2 is rotationally driven by the drive motor M, the eccentric portion 2a rotates eccentrically and the movable scroll 42 slides, in a posture-maintained state, relative to the fixed scroll 41 with the eccentric rotation. At this time, the movable scroll 42 rotates eccentrically with respect to the fixed scroll 41 and, with this rotation, the contact positions of the laps 41b and 42b sequentially move in the rotation direction. A compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Figure 2:
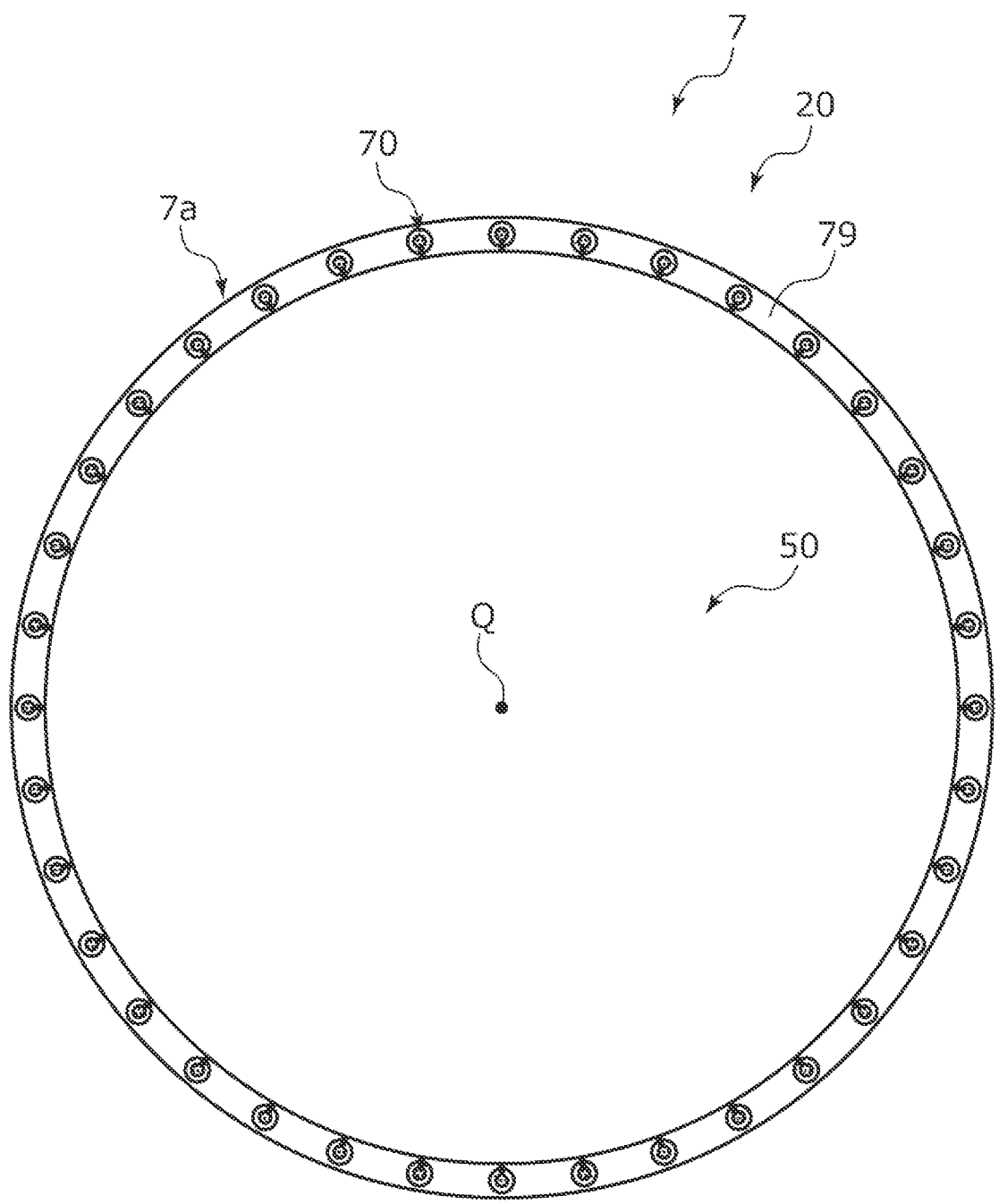
FIG. 2 is a diagram illustrating a sliding surface of the side seal in the first embodiment of the present invention.

Next, the side seal 7 as a sliding component in the present embodiment will be described. As illustrated in FIGS. 2 to 4, the side seal 7 is made of resin and has a rectangular cross section and an annular shape in an axial view. The side seal 7 is fixed to the back surface of the end plate 42a of the movable scroll 42 (see FIG. 1). It should be noted that a sliding surface 7a of the side seal 7 is illustrated in FIGS. 2 and 3A.

The sliding surface 7a abutting against a sliding surface 8a of the thrust plate 8 is formed on one end surface of the side seal 7.

As illustrated in FIG. 2, the sliding surface 7a of the side seal 7 includes a land 79 and a plurality of dynamic pressure generation mechanisms 70. The dynamic pressure generation mechanisms 70 are substantially equally arranged in the circumferential direction of the sliding surface 7a.

Figure 3A:
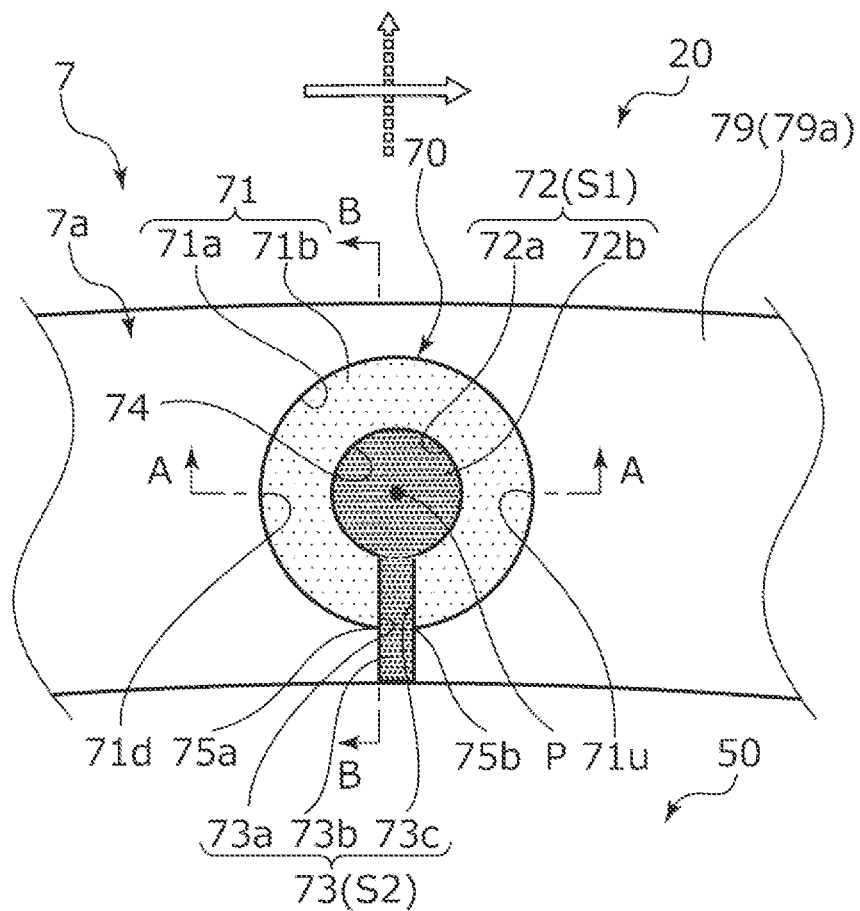
FIG. 3A is a partially enlarged view illustrating a dynamic pressure generation mechanism on the sliding surface.

As illustrated in FIG. 3, the dynamic pressure generation mechanism 70 includes a shallow groove portion 71 having a C shape in an axial view, a deep groove portion 72 having a circular shape in an axial view, and a communication passage 73 having a rectangular shape in an axial view. In FIG. 3A, the shallow groove portion 71 is indicated by coarse dots and the deep groove portion 72 and the communication passage 73 are indicated by fine dots.

It should be noted that for convenience of description, the boundary between the deep groove portion 72 and the communication passage 73 is indicated by a virtual two-dot chain line. The deep groove portion 72 of the first embodiment will be described as a part having a substantially line-symmetrical shape with reference to a virtual circular arc line along the sliding surface 7a. The same applies to each of the following embodiments.

It should be noted that the deep groove portion 72 and the communication passage 73 have substantially the same depth dimension and thus are indicated by common fine dots.

Figure 3B:
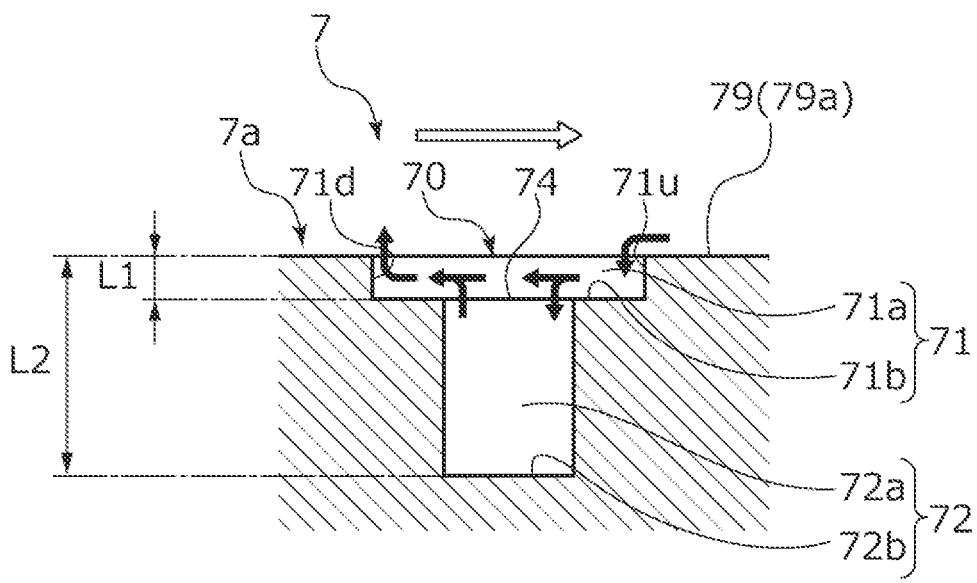
FIG. 3B is a cross-sectional view taken along line A-A in FIG. 3A.
Figure 4:
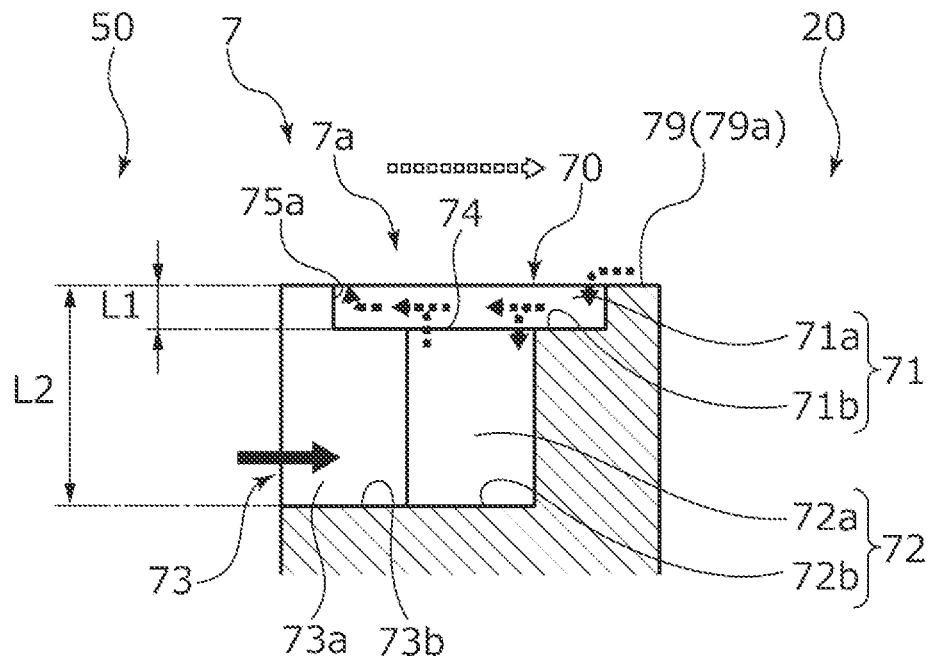
FIG. 4 is a cross-sectional view taken along line B-B in FIG. 3A.

As illustrated in FIG. 3B, the shallow groove portion 71 is formed of a wall surface 71a and a bottom surface 71b. The wall surface 71a extends in a C shape in the depth direction of the shallow groove portion 71 substantially orthogonal to a flat surface 79a of the land 79. The bottom surface 71b extends substantially orthogonal to the end portion of the wall surface 71a and substantially parallel to the surface 79a of the land 79 and is C-shaped and flat.

The deep groove portion 72 is formed of a wall surface 72a and a bottom surface 72b. The wall surface 72a extends in the depth direction of the deep groove portion 72 substantially orthogonal to the inner diameter-side end portion of the bottom surface 71b of the shallow groove portion 71. The bottom surface 72b extends substantially orthogonal to the end portion of the wall surface 72a and substantially parallel to the surface 79a of the land 79 and is circular and flat.

In other words, the deep groove portion 72 is formed in the radial middle portion of the shallow groove portion 71. The wall surface 71a is the outer contour of the shallow groove portion 71. The wall surface 72a is the outer contour of the deep groove portion 72. Both the wall surface 71a and the wall surface 72a are formed concentrically in an axial view with a point P at the center. In other words, the deep groove portion 72 is surrounded in a C shape by the shallow groove portion 71. In this manner, in the present specification, what has a C shape is also treated as one included in a type of annular shape.

In addition, a depth dimension L1 of the shallow groove portion 71 is a dimension from the surface 79a of the land 79 to the bottom surface 71b of the shallow groove portion 71. A depth dimension L2 of the deep groove portion 72 is a dimension from the surface 79a of the land 79 to the bottom surface 72b of the deep groove portion 72. The depth dimension L1 of the shallow groove portion 71 is shallower than the depth dimension L2 of the deep groove portion 72 (L1<L2).

It should be noted that the depth dimensions of the shallow groove portion 71 and the deep groove portion 72 can be freely changed insofar as the depth dimension L2 of the deep groove portion 72 is formed deeper than the depth dimension L1 of the shallow groove portion 71. In addition, from the viewpoint of fluid supply from the deep groove portion 72 to the shallow groove portion 71, which will be described later, it is preferable that the dimensional difference between the depth dimension L1 and the depth dimension L2 is 10 times or more.

In addition, in the dynamic pressure generation mechanism 70, a step 74 is formed by the bottom surface 71b of the shallow groove portion 71 and the wall surface 72a of the deep groove portion 72. The angle between the bottom surface 71b of the shallow groove portion 71 and the wall surface 72a of the deep groove portion 72 in the step 74 is approximately 90 degrees. The shallow groove portion 71 and the deep groove portion 72 communicate with each other over the part where the step 74 is formed (see FIG. 3A).

As illustrated in FIG. 3A, the communication passage 73 is formed of rectangular and flat wall surfaces 73a and 73c extending in the depth direction of the communication passage 73 substantially orthogonal to the surface 79a of the land 79 and the bottom surface 71b of the shallow groove portion 71 and a rectangular and flat bottom surface 73b extending substantially orthogonal to the end portions of the wall surfaces 73a and 73c and substantially parallel to the surface 79a of the land 79 (see FIG. 3B). In other words, the communication passage 73 is a groove formed in the sliding surface 7a. In addition, the circumferential dimension between the wall surfaces 73a and 73c of the communication passage 73 is smaller than the maximum circumferential dimension of the deep groove portion 72.

As for the communication passage 73, both side end portions of the wall surfaces 73a and 73c communicate with the shallow groove portion 71 on the outer diameter side and are partitioned by the land 79 on the inner diameter side, and the outer diameter end in the radial direction communicates with the deep groove portion 72 and the inner diameter end in the radial direction communicates with the back pressure chamber 50.

In addition, as illustrated in FIG. 4, the bottom surface 73b of the communication passage 73 is formed in a substantially coplanar shape continuous with the bottom surface 72b of the deep groove portion 72, and thus the depth dimension of the communication passage 73, which is a dimension from the end surface of the land 79 to the bottom surface 73b of the communication passage 73, is the depth dimension L2, which is equal to the depth dimension of the deep groove portion 72.

In addition, referring to FIG. 3A, an axial-view area S1 of the deep groove portion 72, which is the area of the deep groove portion 72 in the direction parallel to the sliding surface 7a (that is, axial-view area), is larger than an axial-view area S2 of the communication passage 73 (S1>S2).

In addition, in the dynamic pressure generation mechanism 70, corner portions 75a and 75b are formed by the wall surface 71a of the shallow groove portion 71 and the wall surfaces 73a and 73c of the communication passage 73, the angle between the wall surface 71a of the shallow groove portion 71 and the wall surface 73a of the communication passage 73 in the corner portion 75a is approximately 90 degrees, and the angle between the wall surface 71a of the shallow groove portion 71 and the wall surface 73c of the communication passage 73 in the corner portion 75b is approximately 90 degrees.

As illustrated in FIG. 1, the thrust plate 8 is made of metal and has an annular shape, a seal ring 43 is fixed to one end surface of the thrust plate 8, and the seal ring 43 abuts against the inner peripheral surface of the inner casing 3. As a result, the thrust plate 8 functions as a thrust bearing that receives an axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is a closed space formed between the inner casing 3 and the rotary shaft 2. A seal ring 44 is fixed to the inner periphery of a through hole 3a provided in the middle of the other end of the inner casing 3 and is in sliding contact in a sealed shape with the rotary shaft 2 inserted through the through hole 3a. In addition, the high-pressure chamber 30 and the back pressure chamber 50 communicate with each other by means of the back pressure communication passage 14. The back pressure communication passage 14 is formed over the cover 12, the fixed scroll 41, and the inner casing 3 and is provided with an orifice (not illustrated). After depressurization adjustment by means of the orifice, the refrigerant in the high-pressure chamber 30 is supplied to the back pressure chamber 50 together with the lubricating oil separated by the oil separator 6. As a result, the pressure in the back pressure chamber 50 is adjusted to be higher than the pressure in the low-pressure chamber 20. It should be noted that a pressure release hole 16 is formed in the inner casing 3, penetrates the inner casing 3 in the radial direction, and allows the low-pressure chamber 20 and the back pressure chamber 50 to communicate with each other and a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b is formed to have a diameter size at which it is possible to allow eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 (see FIG. 5).

Figure 5A:
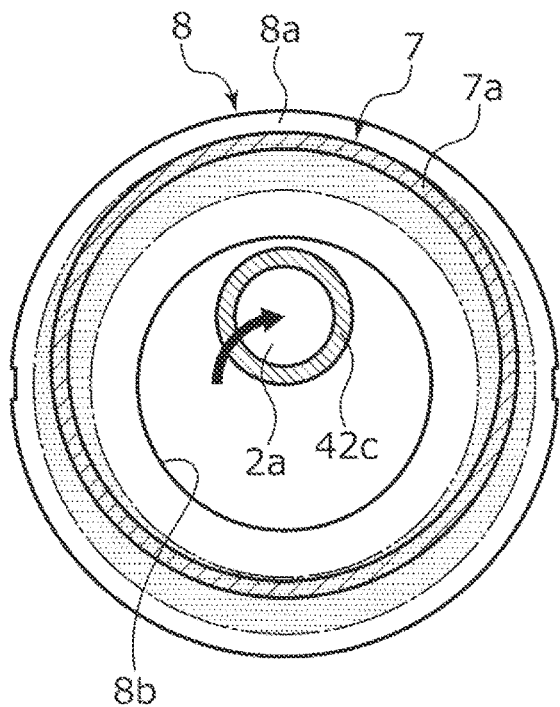
FIG. 5 is a diagram illustrating relative sliding between the sliding surface of the side seal and a sliding surface of a thrust plate in the first embodiment of the present invention. It should be noted that FIG. 5A illustrates the start position of the relative sliding
FIGS. 5B to 5D illustrate the positional relationships between the relatively sliding surfaces of the side seal and the thrust plate at an eccentric rotary shaft rotation of 90, 180, and 270 degrees, respectively.
Figure 5B:
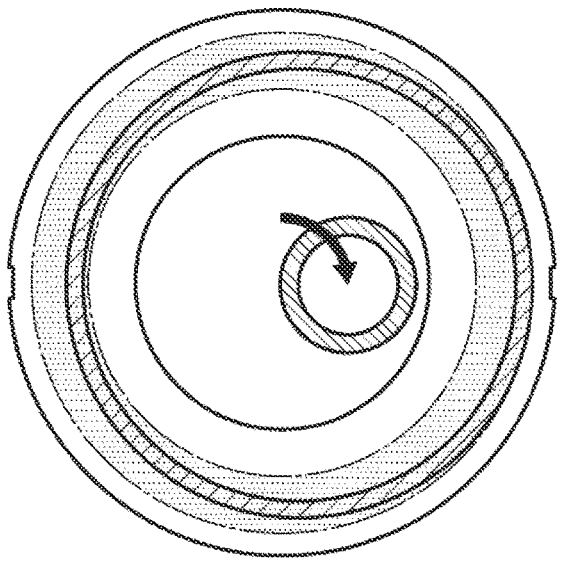
Figure 5C:
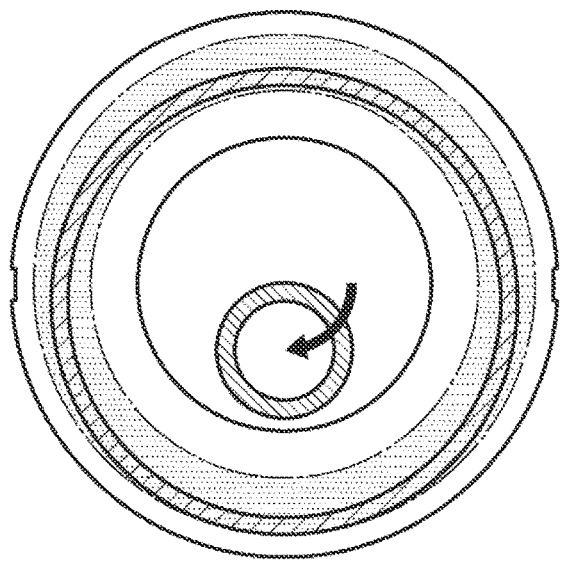
Figure 5D:
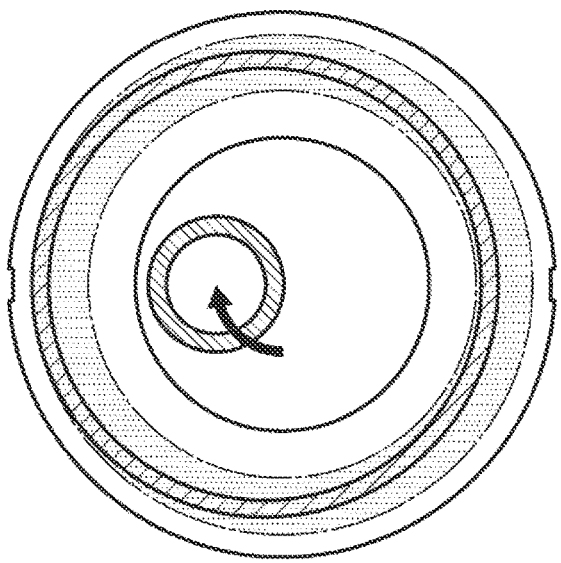

It should be noted that FIGS. 5A to 5D in FIG. 5 illustrate the rotational trajectory of the boss 42c that is viewed from the fixed scroll 41 (see FIG. 1) side and indicated by the black arrows. Respectively illustrated in FIGS. 5B to 5D are the boss 42c rotated by 90 degrees, 180 degrees, and 270 degrees with FIG. 5A serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with the eccentric rotation.

Next, dynamic pressure generation during the sliding of the side seal 7 relative to the thrust plate 8 will be described with reference to FIGS. 3, 4, and 6 to 9. It should be noted that a fluid containing, for example, a refrigerant and lubricating oil is stored in the dynamic pressure generation mechanism 70 even when the rotation is stopped. In addition, the white and dotted white arrows in FIG. 3A indicate the relative sliding directions of the dynamic pressure generation mechanism 70, the white arrow indicates a case where the side seal 7 moves in the circumferential direction, and the dotted white arrow indicates a case where the side seal 7 moves in the outer diameter direction. In addition, the side seal 7 that is viewed from the drive motor M (see FIG. 1) side is illustrated in each of FIGS. 6 to 9 and the circle mark on the wall surface 71a of the dynamic pressure generation mechanism 70 indicates the point where the pressure is highest in each dynamic pressure generation mechanism 70.

As illustrated in FIG. 3, when the side seal 7 slides relative to the thrust plate 8 (see FIG. 1), in a case where the side seal 7 moves in the direction indicated by the white arrow, the fluid in the dynamic pressure generation mechanism 70 receives a shear force in the direction indicated by the black arrow (see FIG. 3B), which is substantially opposite in direction to the white arrow, and moves in that direction. It should be noted that the black arrow indicating the direction in which the fluid flows is illustrated only in FIG. 3B.

As a result, the pressure of the fluid increases at a part 71*d* downstream of the deep groove portion 72 of the shallow groove portion 71, and a positive dynamic pressure is generated. It should be noted that in the following description, positive dynamic pressure may be simply described as dynamic pressure.

In addition, at a part 71*u* upstream of the deep groove portion 72 of the shallow groove portion 71, the fluid moves toward the part 71*d* downstream of the deep groove portion 72 of the shallow groove portion 71. In the deep groove portion 72, not only is a large amount of fluid stored, but also there is the communication passage 73 into which a high-pressure fluid flows from the back pressure chamber 50, and thus negative pressure is slightly generated or is not generated at the part 71*u* without a sharp decrease in the fluid at the part 71*u*.

As a result of the dynamic pressure generation, the sliding surfaces 7*a* and 8*a* are slightly separated from each other and a fluid film is formed by the fluid flowing in between the sliding surfaces 7*a* and 8*a*. As a result, the lubricity between the sliding surfaces 7*a* and 8*a* is improved, and thus the frictional resistance between the sliding surfaces 7*a* and 8*a* during sliding decreases. At this time, local negative pressure generation is unlikely in the shallow groove portion 71 as described above, and thus cavitation is unlikely to occur with the dynamic pressure generation.

Figure 6:
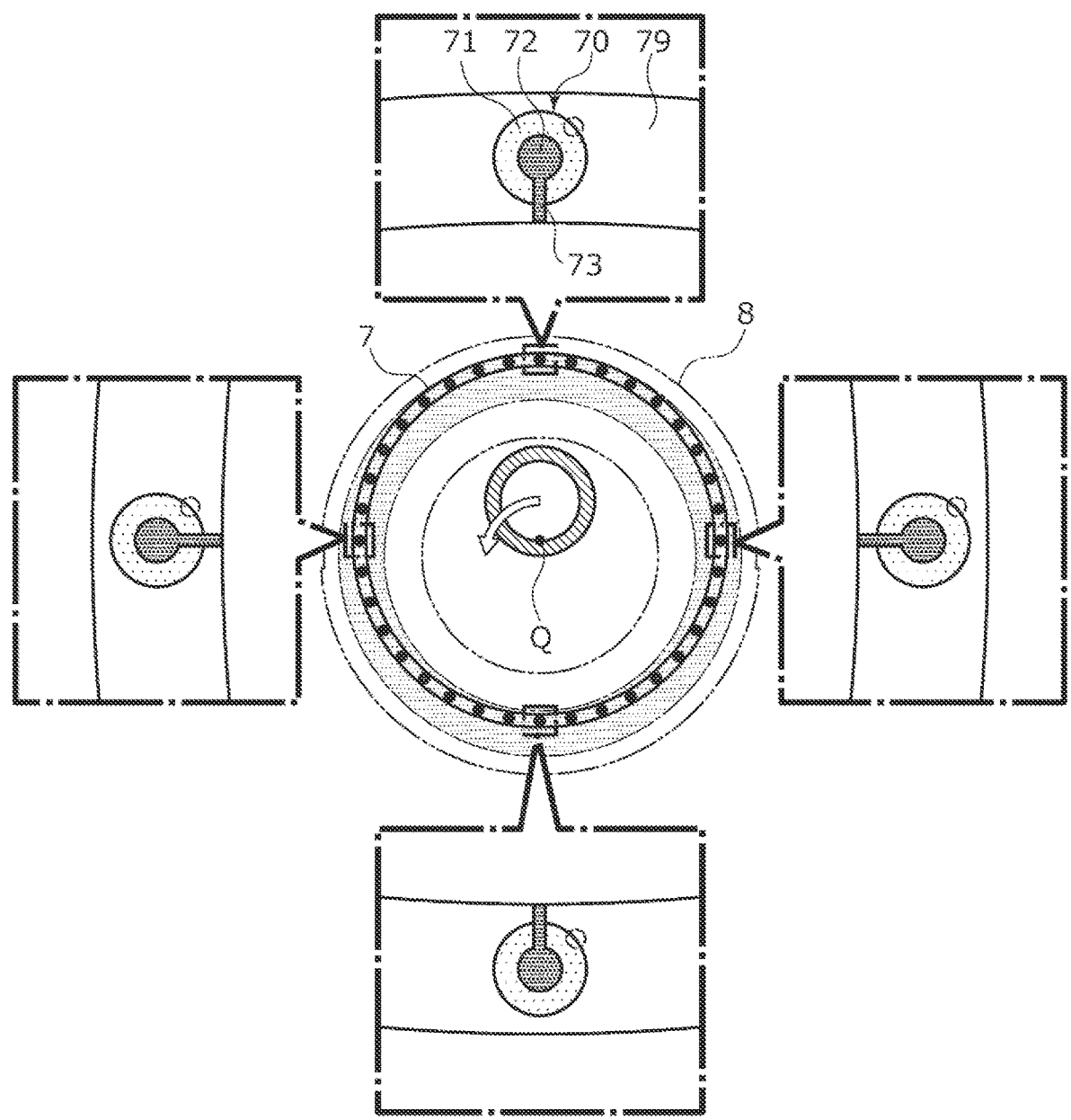
FIG. 6 is a diagram illustrating the distribution of the pressure generated in a plurality of grooves as a result of the relative movement of the groove entailed by the eccentric rotary shaft rotation in the sliding surface of the side seal illustrated in FIG. 4A.

Next, dynamic pressure generation over the entire side seal 7 will be described. Referring to FIG. 6, when the side seal 7 is to move from the rotational state of FIG. 5A to the rotational state of FIG. 5B as indicated by the white arrow, the fluid moves relative to the white arrow in the opposite direction. In each dynamic pressure generation mechanism 70, the fluid in the shallow groove portion 71 moves toward the region on the upper right side of the wall surface 71*a* and dynamic pressure is generated.

Figure 7:
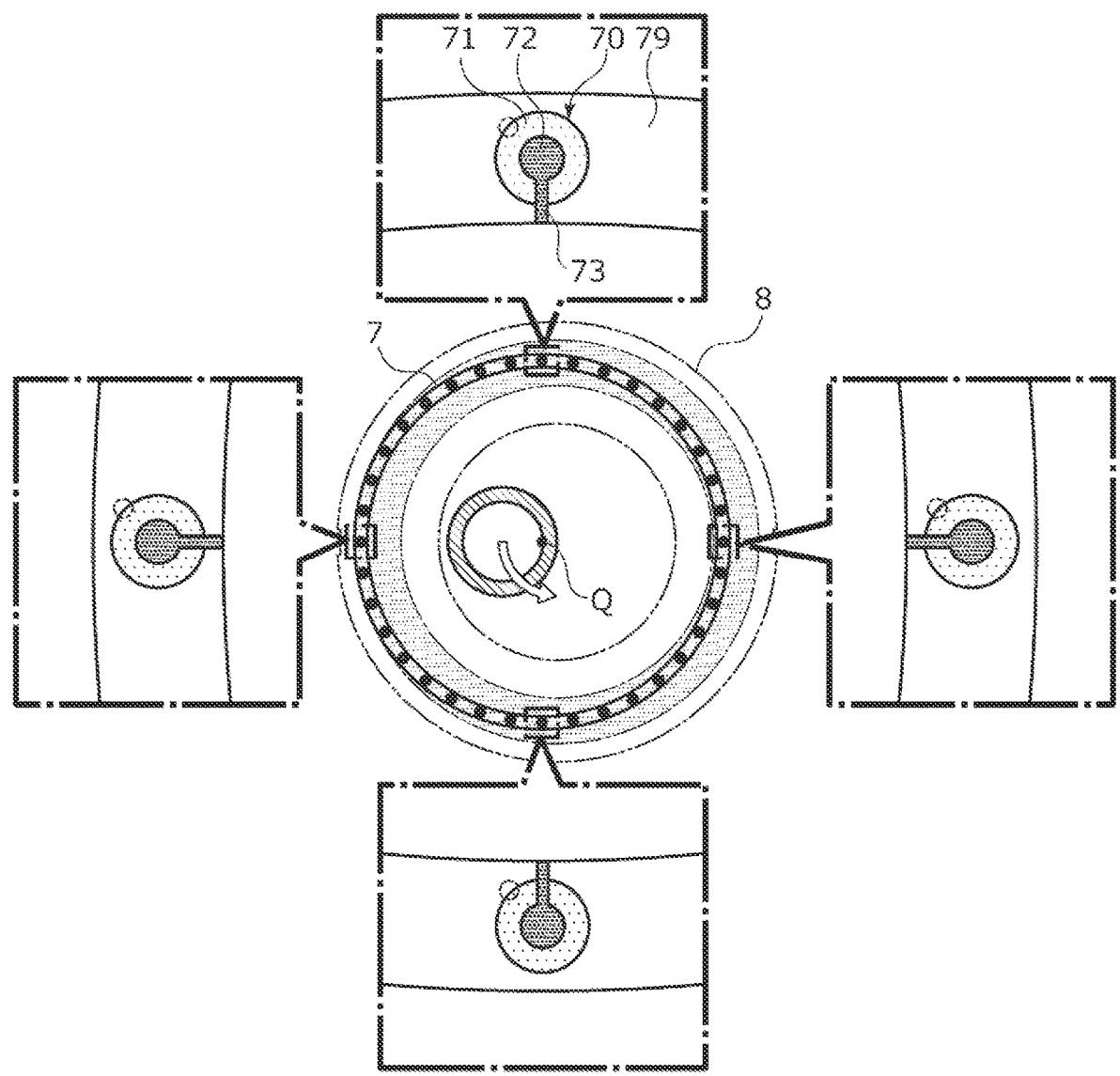
FIG. 7 is a diagram illustrating the distribution of the pressure generated in the plurality of grooves as a result of the relative movement of the groove entailed by the eccentric rotary shaft rotation in the sliding surface of the side seal illustrated in FIG. 4B.

In addition, referring to FIG. 7, when the side seal 7 is to move from the rotational state of FIG. 5B to the rotational state of FIG. 5C as indicated by the white arrow, the fluid moves relative to the white arrow in the opposite direction. In each dynamic pressure generation mechanism 70, the fluid in the shallow groove portion 71 moves toward the region on the upper left side of the wall surface 71*a* and dynamic pressure is generated.

Figure 8:
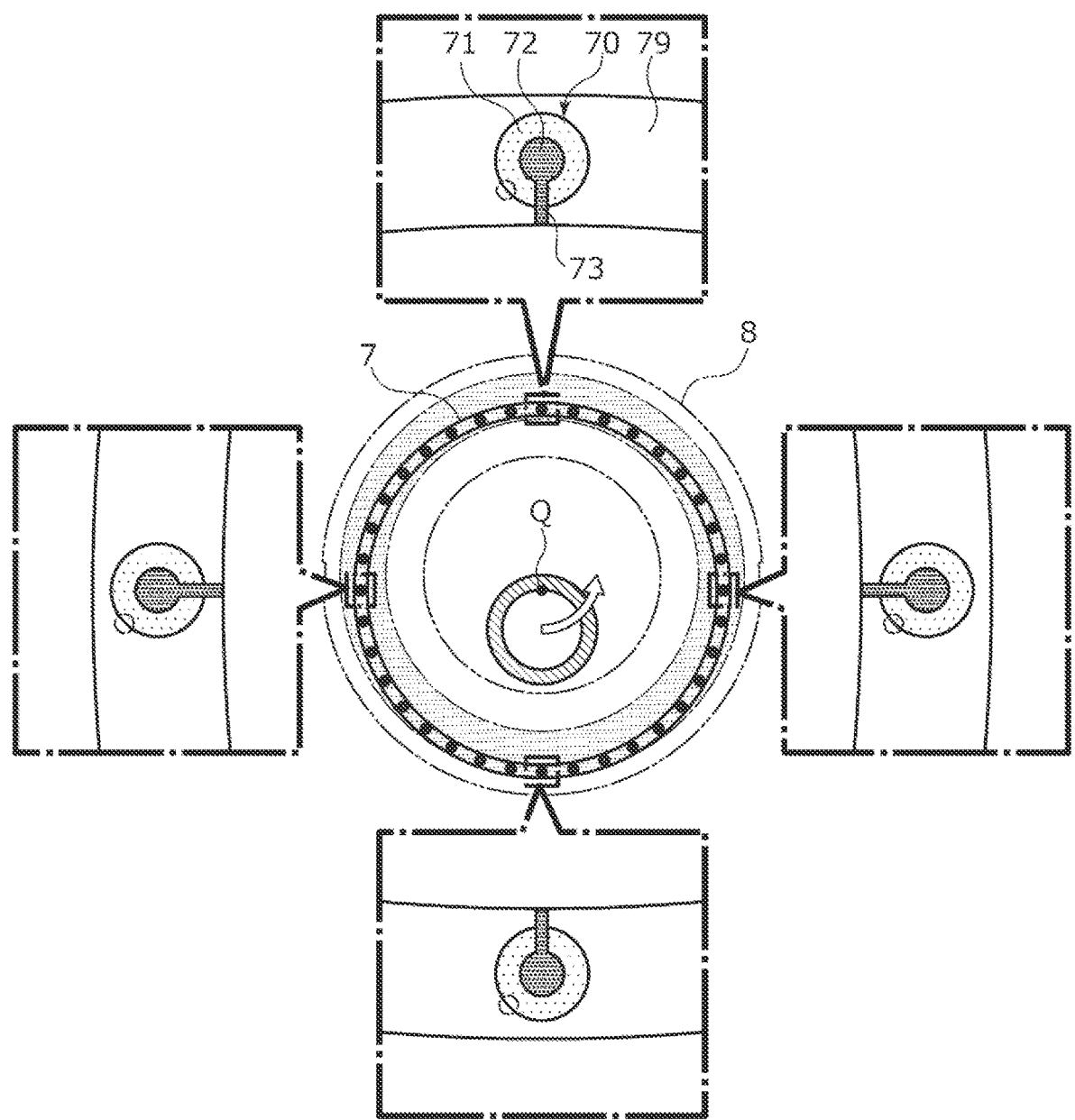
FIG. 8 is a diagram illustrating the distribution of the pressure generated in the plurality of grooves as a result of the relative movement of the groove entailed by the eccentric rotary shaft rotation in the sliding surface of the side seal illustrated in FIG. 4C.

In addition, referring to FIG. 8, when the side seal 7 is to move from the rotational state of FIG. 5C to the rotational state of FIG. 5D as indicated by the white arrow, the fluid moves relative to the white arrow in the opposite direction. In each dynamic pressure generation mechanism 70, the fluid in the shallow groove portion 71 moves toward the region on the lower left side of the wall surface 71*a* and dynamic pressure is generated.

Figure 9:
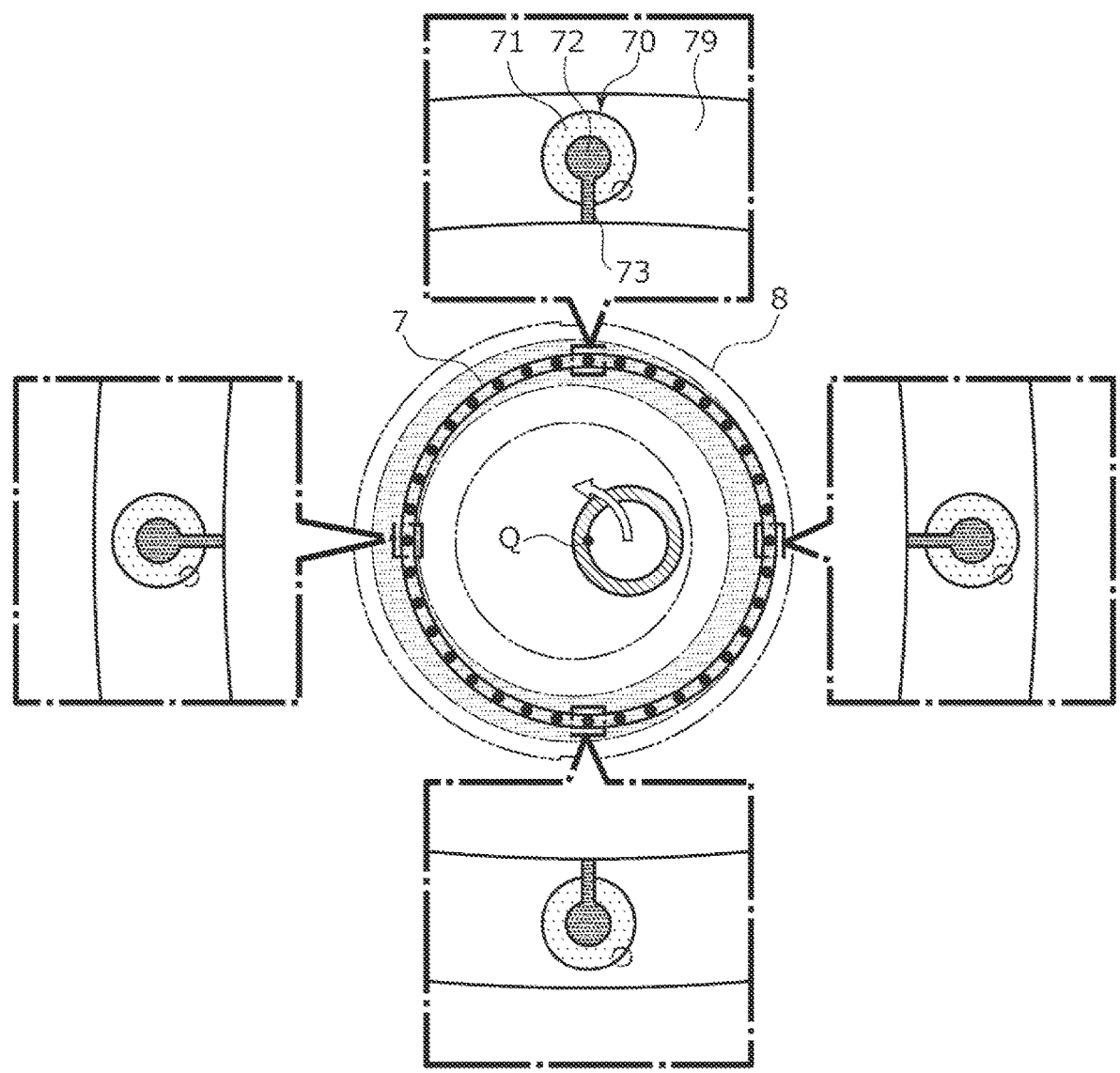
FIG. 9 is a diagram illustrating the distribution of the pressure generated in the plurality of grooves as a result of the relative movement of the groove entailed by the eccentric rotary shaft rotation in the sliding surface of the side seal illustrated in FIG. 4D.

In addition, referring to FIG. 9, when the side seal 7 is to move from the rotational state of FIG. 5D to the rotational state of FIG. 5A as indicated by the white arrow, the fluid moves relative to the white arrow in the opposite direction. In each dynamic pressure generation mechanism 70, the fluid in the shallow groove portion 71 moves toward the region on the lower right side of the wall surface 71*a* and dynamic pressure is generated.

As described above, in the dynamic pressure generation mechanism 70, the wall surface 71*a* of the shallow groove portion 71 is formed in a C shape in an axial view.

Accordingly, in each dynamic pressure generation mechanism 70, the point of the pressure generated on the wall surface 71*a* gradually moves along the wall surface 71*a* in accordance with the rotation angle of the boss 42*c* (see FIGS. 6 to 9). In this manner, by the circumferential dimension between the wall surfaces 73*a* and 73*c* of the communication passage 73 being smaller than the maximum circumferential dimension of the deep groove portion 72, large regions can be ensured as the wall surface 72*a* of the deep groove portion 72 and the wall surface 71*a* of the shallow groove portion 71 and dynamic pressure can be reliably generated.

At this time, regardless of the eccentric rotation angle, that is, the eccentric rotation phase in each shallow groove portion 71, the angles of the points where the dynamic pressure is generated in the respective shallow groove portions 71 are substantially the same. Accordingly, the points where the dynamic pressure is generated are equidistantly scattered in a substantially circumferential direction over the sliding surface 7*a* of the side seal 7. As a result, it is easy to maintain a state where the sliding surfaces 7*a* and 8*a* are parallel to each other.

In addition, as indicated by the black arrow in FIG. 4, the high-pressure fluid is capable of flowing from the back pressure chamber 50 into the communication passage 73. Accordingly, outflow to the back pressure chamber 50 is suppressed by the high-pressure fluid to flow into the communication passage 73 even in a case where the dynamic pressure generation mechanism 70 is relatively slid such that the fluid in the dynamic pressure generation mechanism 70 moves to the back pressure chamber 50 through the communication passage 73, that is, a case where the side seal 7 moves in the direction indicated by the dotted white arrow in FIG. 4.

In addition, as indicated by the dotted black arrow in FIG. 4, dynamic pressure is generated even in the vicinity of the communication passage 73 in the dynamic pressure generation mechanism 70, the vicinity of the corner portions 75*a* and 75*b* in particular. From this, the points where the dynamic pressure is generated in the dynamic pressure generation mechanisms 70 are scattered in a substantially circumferential direction over the sliding surface 7*a* of the side seal 7, and thus the relative angle between the sliding surfaces 7*a* and 8*a* is kept small.

In addition, in the dynamic pressure generation mechanism 70, the wall surface 71*a* of the shallow groove portion 71 is continuous with the same radius of curvature, and thus the pressure generated in each shallow groove portion 71 is substantially the same regardless of the eccentric rotation angle. As a result, the dynamic pressure generated in each shallow groove portion 71 between the sliding surfaces 7*a* and 8*a* is unlikely to change sharply, and the generated dynamic pressure can be stabilized.

In addition, the points where the dynamic pressure is generated between the sliding surfaces 7*a* and 8*a* are scattered in a substantially circumferential direction over the sliding surface 7*a* of the side seal 7, and thus it is easy to maintain the parallelism between the sliding surfaces 7*a* and 8*a* regardless of the eccentric rotation angle.

In addition, the communication passage 73 of the dynamic pressure generation mechanism 70 is a groove, and thus the high-pressure fluid flowing in from the back pressure chamber 50 can be supplied between the sliding surfaces 7*a* and 8*a* also from the communication passage 73. Accordingly, the lubricity between the sliding surfaces 7*a* and 8*a* can be improved.

In addition, as for the dynamic pressure generation mechanism 70, the high-pressure fluid directly flows from the back pressure chamber 50 through the communication passage 73 into the shallow groove portion 71 and the deep groove portion 72. Accordingly, the pressure in the dynamic pressure generation mechanism 70 is relatively increased as compared with, for example, a configuration in which the communication passage 73 is not formed and no high-pressure fluid directly flows in from the back pressure chamber 50. As a result, it is easy to separate the sliding surfaces 7a and 8a from each other.

In addition, in each dynamic pressure generation mechanism 70, the point of the pressure generated on the wall surface 71a gradually moves along the wall surface 71a in accordance with the rotation angle of the boss 42c (see FIGS. 6 to 9). Accordingly, the fluid flowing out of the dynamic pressure generation mechanism 70 upstream in the circumferential direction between the sliding surfaces 7a and 8a with the generation of the dynamic pressure is likely to flow into the dynamic pressure generation mechanism 70 adjacent on the downstream side at that time. Accordingly, not only it is easy for a fluid film to be formed by the fluid over the circumferential direction between the sliding surfaces 7a and 8a, but also the fluid on the land 79 is likely to be supplied into the dynamic pressure generation mechanism 70 (see FIG. 3B).

In addition, in the dynamic pressure generation mechanism 70, the fluid in the deep groove portion 72 moves into the shallow groove portion 71 as the fluid in the shallow groove portion 71 moves (see FIG. 3B). As a result, dynamic pressure is generated in the shallow groove portion 71 and, even in the event of fluid outflow from the shallow groove portion 71 to the land 79, the fluid stored in the deep groove portion 72 is supplied into the shallow groove portion 71. Accordingly, dynamic pressure can be reliably generated in the shallow groove portion 71.

In addition, in the dynamic pressure generation mechanism 70, the deep groove portion 72 is formed concentrically with the shallow groove portion 71 and the wall surface 72a of the deep groove portion 72 is formed in a C shape in an axial view and continuous with the same radius of curvature. In other words, the width between the wall surface 71a of the shallow groove portion 71 and the wall surface 72a of the deep groove portion 72 is substantially uniform over the circumferential direction and communication with the shallow groove portion 71 occurs over the part where the step 74 is formed. Accordingly, a fluid is smoothly supplied to the shallow groove portion 71 no matter where dynamic pressure is generated in the shallow groove portion 71.

In addition, as for the dynamic pressure generation mechanism 70, a high-pressure fluid can be supplied into the shallow groove portion 71 through the communication passage 73, and thus not only can dynamic pressure be reliably generated in the shallow groove portion 71, but also negative pressure generation can be reliably suppressed. As a result, the lubricity between the sliding surfaces 7a and 8a can be further improved.

In addition, as for the dynamic pressure generation mechanism 70, the communication passage 73 communicates with the deep groove portion 72. Accordingly, even in the event of fluid supply from the deep groove portion 72 to the shallow groove portion 71, the fluid is supplied from the back pressure chamber 50 to the deep groove portion 72 through the communication passage 73, and the fluid in the deep groove portion 72 is prevented from being depleted.

In addition, as for the dynamic pressure generation mechanism 70, the shallow groove portion 71 and the deep groove portion 72 are partitioned by the step 74, and thus a large volume can be formed in the deep groove portion 72. For example, in the configuration of a comparative example with a tapered surface that decreases in radius of curvature with an increase in depth with at least the bottom surface of a shallow groove portion and the wall surface of a deep groove portion continuous in a flat shape, that is, a configuration in which shallow and deep groove portions are not partitioned by a step, the internal volume of the deep groove portion is small. In this manner, the amount of fluid that can be stored in the deep groove portion 72 can be increased, and thus a fluid can be reliably supplied into the shallow groove portion 71 and it is possible to reliably suppress the occurrence of cavitation while generating dynamic pressure.

In addition, the wall surface 72a of the deep groove portion 72 has a continuous shape with the same radius of curvature with the point P at the center, and thus a sufficient fluid can be ensured and the fluid can be stably supplied into the shallow groove portion 71. For example, in the shape of a comparative example in which the radius of curvature of a wall surface decreases toward a bottom surface, the amount of fluid that can be stored decreases.

It should be noted that various cross-sectional shapes may be given to the deep groove portion and, in one example thereof, the radius of curvature of a wall surface may increase toward a bottom surface.

In addition, as for the side seal 7, the depth dimension L2 of the deep groove portion 72 is 10 times or more the depth dimension L1 of the shallow groove portion 71, and thus a large amount of fluid can be stored in the deep groove portion 72.

In addition, as for the dynamic pressure generation mechanism 70, the axial-view area S1 of the deep groove portion 72 is larger than the axial-view area S2 of the communication passage 73 (S1>S2), and thus a fluid storage amount can be ensured in the deep groove portion 72.

As described above, in the side seal 7, a high pressure-side fluid is always supplied to the deep groove portion 72 through the communication passage 73, and the high pressure-side fluid stored in the deep groove portion 72 is stably supplied into the shallow groove portion 71 in accordance with the direction of the relative movement of the shallow groove portion 71 entailed by eccentric rotation. Accordingly, by generating dynamic pressure in the shallow groove portion 71 to slightly separate the sliding surfaces 7a and 8a from each other and form a fluid film, not only can the lubricity between the sliding surfaces 7a and 8a be improved, but also the occurrence of cavitation can be suppressed. In this manner, the frictional resistance of the sliding surfaces 7a and 8a during sliding can be stably reduced.

Second Embodiment

Next, a sliding surface 107a of a side seal 107 in a second embodiment of the present invention will be described with reference to FIG. 10. It should be noted that the description of configurations identical to those of the first embodiment will be omitted for redundancy avoidance.

Figure 10:
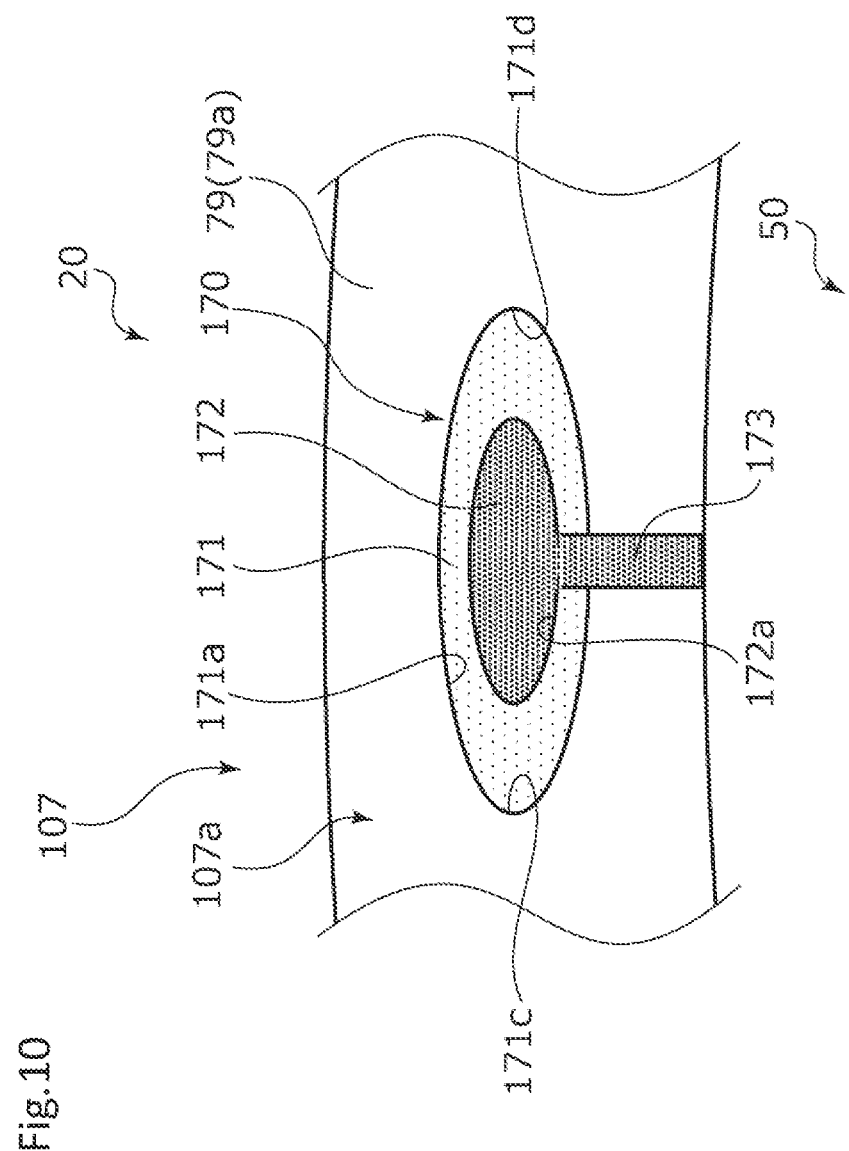
FIG. 10 is a partially enlarged view illustrating a dynamic pressure generation mechanism of a sliding component according to a second embodiment of the present invention.

As illustrated in FIG. 10, a dynamic pressure generation mechanism 170 includes a shallow groove portion 171 having a C shape in an axial view, in which the circumferential dimension is longer than the radial dimension, an elliptical deep groove portion 172 having a C shape in an axial view as in the case of the shallow groove portion 171, and a communication passage 173 having a rectangular shape in an axial view. It should be noted that for convenience of description, the boundary between the deep groove portion 172 and the communication passage 173 is indicated by a virtual two-dot chain line.

As a result, the curvatures of circumferential end portions 171c and 171d of a wall surface 171a of the shallow groove portion 171 are the smallest. Accordingly, in a case where the dynamic pressure generation mechanism 170 relatively moves mainly in the circumferential direction, fluid concentration is likely in either the circumferential end portion 171c or the circumferential end portion 171d positioned on the side opposite to the movement direction. Accordingly, it is possible to increase the dynamic pressure generated in either the circumferential end portion 171c or the circumferential end portion 171d.

In addition, as for the shallow groove portion 171 and the deep groove portion 172, the wall surface 171a of the shallow groove portion 171 and a wall surface 172a of the deep groove portion 172 are substantially similar to each other, and thus the width between the wall surface 171a of the shallow groove portion 171 and the wall surface 172a of the deep groove portion 172 is unlikely to change greatly over the circumferential direction. As a result, a fluid can be smoothly supplied from the inside of the deep groove portion 172 no matter where dynamic pressure is generated in the shallow groove portion 171.

Third Embodiment

Next, a sliding surface 207a of a side seal 207 in a third embodiment of the present invention will be described with reference to FIG. 11. It should be noted that the description of configurations identical to those of the first embodiment will be omitted for redundancy avoidance.

Figure 11:
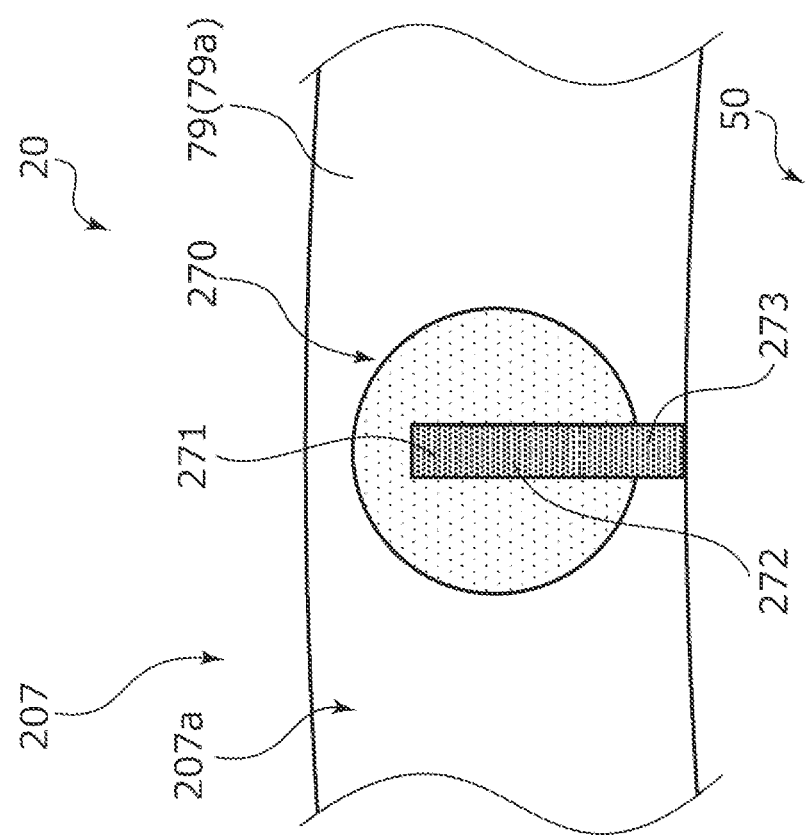
FIG. 11 is a partially enlarged view illustrating a dynamic pressure generation mechanism of a sliding component according to a third embodiment of the present invention.

As illustrated in FIG. 11, a dynamic pressure generation mechanism 270 includes a shallow groove portion 271 having a C shape in an axial view, a deep groove portion 272 radially long and rectangular in an axial view, and a communication passage 273 radially long and rectangular in an axial view. It should be noted that for convenience of description, the boundary between the deep groove portion 272 and the communication passage 273 is indicated by a virtual two-dot chain line.

As a result, a high-pressure fluid easily moves to the deep groove portion 272 after flowing into the communication passage 273, and thus the efficiency of fluid supply to the deep groove portion 272 is satisfactory.

In addition, the deep groove portion 272 and the communication passage 273 have substantially the same flow path cross-sectional shape and thus are formed with ease.

Fourth Embodiment

Next, a sliding surface 307a of a side seal 307 in a fourth embodiment of the present invention will be described with reference to FIG. 12. It should be noted that the description of configurations identical to those of the first embodiment will be omitted for redundancy avoidance.

Figure 12:
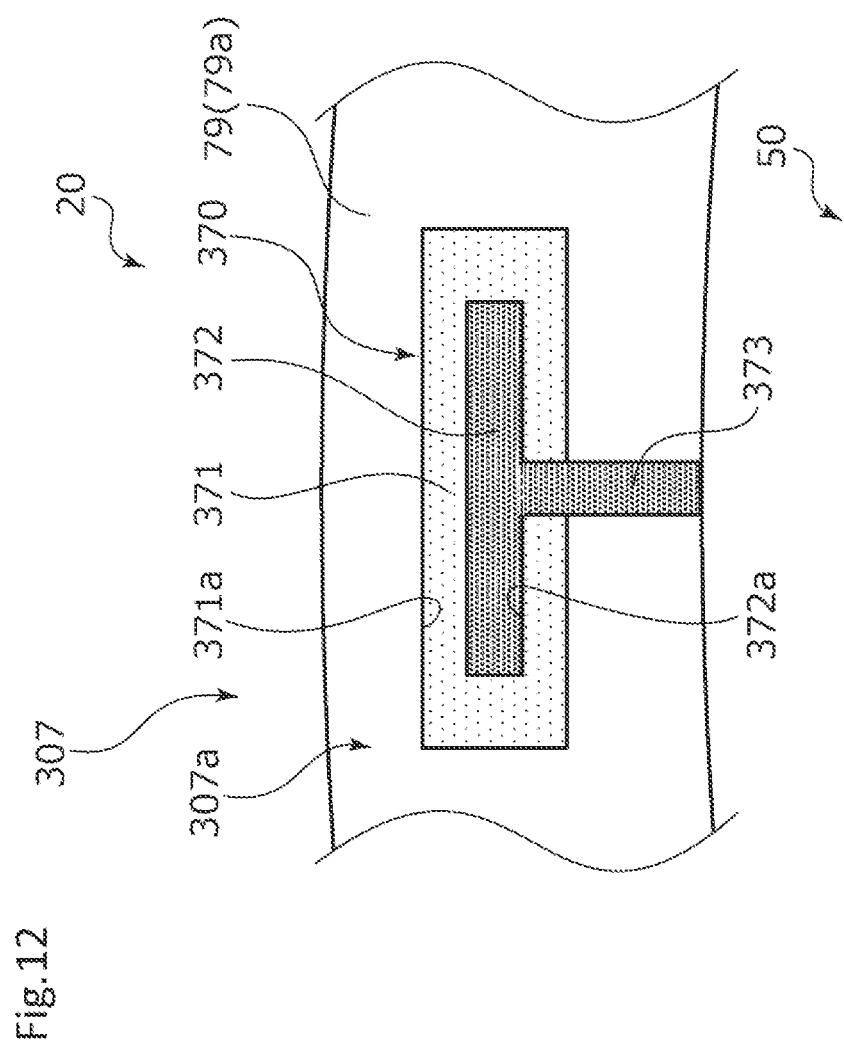
FIG. 12 is a partially enlarged view illustrating a dynamic pressure generation mechanism of a sliding component according to a fourth embodiment of the present invention.

As illustrated in FIG. 12, a dynamic pressure generation mechanism 370 includes a shallow groove portion 371 circumferentially long and rectangular and C-shaped in an axial view, a deep groove portion 372 circumferentially long and rectangular in an axial view, and a communication passage 373 radially long and rectangular in an axial view. In addition, the shallow groove portion 371 extends in a direction substantially orthogonal to the communication passage 373. It should be noted that for convenience of description, the boundary between the deep groove portion 372 and the communication passage 373 is indicated by a virtual two-dot chain line.

It should be noted that the deep groove portion 372 may be formed in a circular arc shape in an axial view although the deep groove portion 372 has been described as a configuration rectangular in an axial view.

As a result, four corner portions of approximately 90 degrees are formed on a wall surface 371a of the shallow groove portion 371. Accordingly, in a case where the dynamic pressure generation mechanism 170 relatively moves, fluid concentration is likely in the corner portion positioned on the side diagonal to the movement direction, and thus the dynamic pressure generated in each corner portion can be increased.

In addition, as for the shallow groove portion 371 and the deep groove portion 372, the wall surface 371a of the shallow groove portion 371 and a wall surface 372a of the deep groove portion 372 are substantially similar to each other, and thus the width between the wall surface 371a of the shallow groove portion 371 and the wall surface 372a of the deep groove portion 372 is unlikely to change greatly over the circumferential direction. As a result, a fluid can be smoothly supplied from the inside of the deep groove portion 372 no matter where dynamic pressure is generated in the shallow groove portion 371.

Fifth Embodiment

Next, a sliding surface 407a of a side seal 407 in a fifth embodiment of the present invention will be described with reference to FIG. 13. It should be noted that the description of configurations identical to those of the first embodiment will be omitted for redundancy avoidance.

Figure 13:
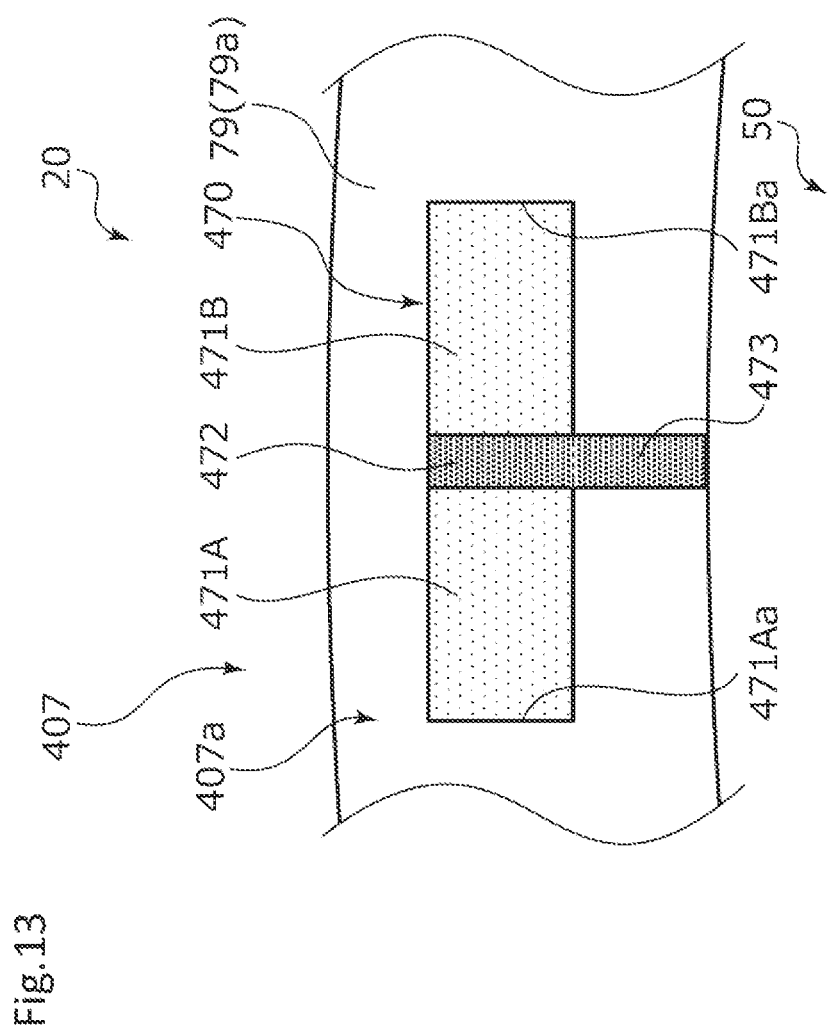
FIG. 13 is a partially enlarged view illustrating a dynamic pressure generation mechanism of a sliding component according to a fifth embodiment of the present invention.

As illustrated in FIG. 13, a dynamic pressure generation mechanism 470 includes a pair of shallow groove portions 471A and 471B circumferentially long and rectangular in an axial view, a deep groove portion 472 radially long and rectangular in an axial view, and a communication passage 473 radially long and rectangular in an axial view. The shallow groove portions 471A and 471B have symmetrical shapes and are partitioned in the circumferential direction by the deep groove portion 472. It should be noted that for convenience of description, the boundary between the deep groove portion 472 and the communication passage 473 is indicated by a virtual two-dot chain line.

As a result, two corner portions of approximately 90 degrees are formed on a wall surface 471Aa of the shallow groove portion 471A and two corner portions of approximately 90 degrees are formed on a wall surface 471Ba of the shallow groove portion 471B. Accordingly, in a case where the dynamic pressure generation mechanism 170 relatively moves, fluid concentration is likely in the corner portion positioned on the side opposite to the movement direction, and thus the dynamic pressure generated in each corner portion can be increased.

In addition, the deep groove portion 472 and the communication passage 473 have substantially the same flow path cross-sectional shape and thus are formed with ease.

Sixth Embodiment

Next, a sliding surface 507a of a side seal 507 in a sixth embodiment of the present invention will be described with reference to FIG. 14. It should be noted that the description of configurations identical to those of the first embodiment will be omitted for redundancy avoidance.

Figure 14A:
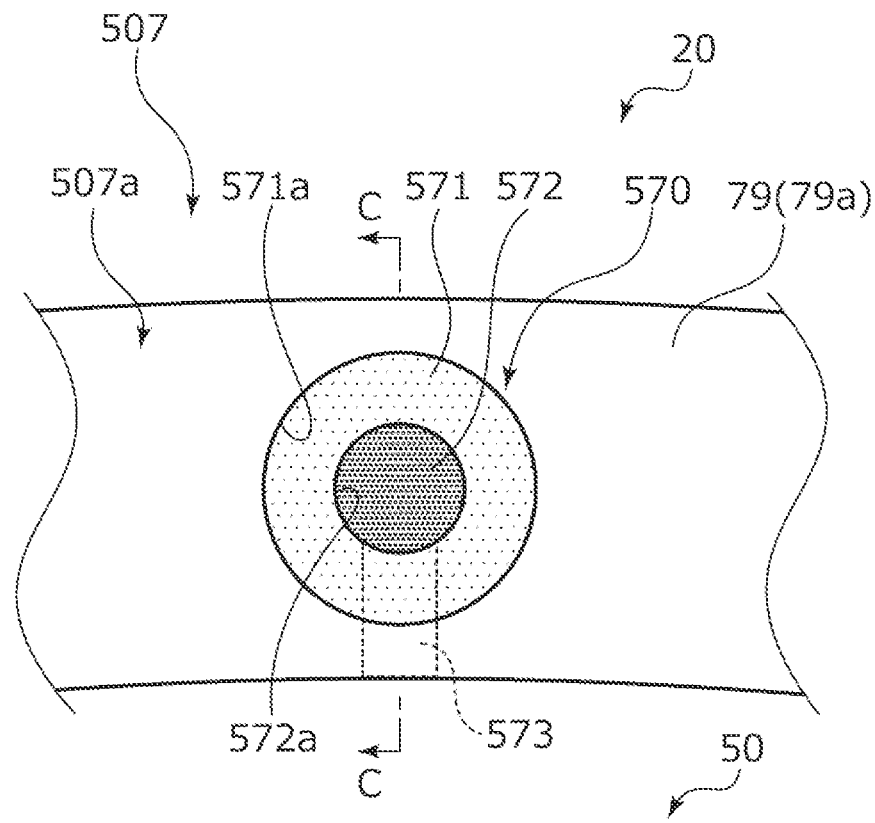
FIG. 14A is a partially enlarged view illustrating a dynamic pressure generation mechanism of a sliding component according to a sixth embodiment of the present invention.
Figure 14B:
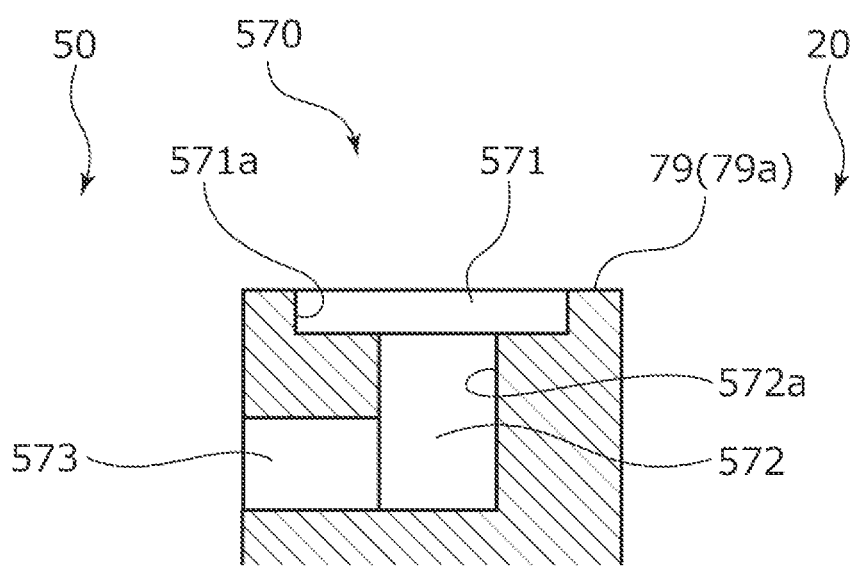
FIG. 14B is a cross-sectional view taken along line B-B in FIG. 14A.

As illustrated in FIG. 14, a dynamic pressure generation mechanism 570 includes a shallow groove portion 571 annular in an axial view, a deep groove portion 572 circular in an axial view, and a communication passage 573, which is a communication hole circular in a radial view, separated from the surface 79a of the land 79 in the depth direction of the deep groove portion 572, and communicating with the bottom portion of the deep groove portion 572 and the inner diameter side of the side seal 507.

As a result, since the communication passage 573 is a communication hole, a high pressure-side fluid can be stably supplied to the deep groove portion 572 through the communication passage 573 without being affected by the sliding surface 7a.

In addition, the shallow groove portion 571 surrounds the entire circumference of the deep groove portion 572, and thus dynamic pressure can be generated at any position over the entire circumference in the shallow groove portion 571 in accordance with the direction of the relative movement of the shallow groove portion 571 entailed by eccentric rotation.

In addition, since the shallow groove portion 571 is annular in an axial view, a substantially uniform dynamic pressure can be generated in each shallow groove portion 571 regardless of the direction of the relative movement of the shallow groove portion entailed by eccentric rotation.

In addition, as for the shallow groove portion 571 and the deep groove portion 572, a wall surface 571a of the shallow groove portion 571 and a wall surface 572a of the deep groove portion 572 are substantially similar to each other, the wall surface 571a of the shallow groove portion 571 and the wall surface 572a of the deep groove portion 572 are concentric, and thus the width between the wall surface 571a of the shallow groove portion 571 and the wall surface 572a of the deep groove portion 572 is substantially uniform over the circumferential direction. As a result, a fluid can be smoothly supplied from the inside of the deep groove portion 572 no matter where dynamic pressure is generated in the shallow groove portion 571.

Although the first to sixth embodiments of the present invention have been described above with reference to the drawings, the specific configurations are not limited to the first to sixth embodiments and any changes or additions within the scope of the present invention are included in the present invention.

Although an aspect in which a side seal as a sliding component is applied to a scroll compressor used in the air conditioning system of an automobile or the like has been described in the first to sixth embodiments, the present invention is not limited thereto and the side seal as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

In addition, insofar as the sliding component of the present invention has a sliding surface that relatively slides with eccentric rotation, the sliding component of the present invention may be used in an environment in which the pressure inside the sliding surface and the pressure outside the sliding surface are substantially equal to each other without being limited to an environment in which there is a pressure difference between the inside and outside of the sliding surface. In addition, the sliding component of the present invention does not have to function as a seal and may be one capable of reducing friction on a sliding surface.

In addition, although the side seal having the relatively sliding surface is made of resin and the thrust plate is made of metal in the first to sixth embodiments, the material of the sliding component may be freely selected in accordance with the environment of use and so on.

In addition, although an aspect in which a dynamic pressure generation mechanism is formed in the sliding surface of the side seal has been described in the first to sixth embodiments, the present invention is not limited thereto. A groove may be formed in the sliding region of the sliding surface of the thrust plate (see FIG. 5), which is a sliding component having a sliding surface relatively sliding with eccentric rotation. In addition, grooves may be formed in both the sliding surface of the side seal and the sliding surface of the thrust plate.

In addition, although a configuration in which the sliding surface of the side seal as a sliding component and the sliding surface of the thrust plate slide relative to each other with eccentric rotation has been described in the first to sixth embodiments, the present invention is not limited thereto. A groove may be formed in the sliding surface relatively sliding with eccentric rotation with only one of the side seal and the thrust plate provided. For example, in a case where only the thrust plate is provided, grooves may be formed in one or both of the sliding surface of the thrust plate as a sliding component and the back surface of the end plate of the movable scroll. In addition, in a case where only the side seal is provided, a groove may be formed in the sliding surface of the side seal as a sliding component. In this case, the side seal also functions as a thrust bearing that abuts against the inner peripheral surface of the inner casing and receives the axial load of the movable scroll.

In a case where the side seal and the thrust plate are not provided and the back surface of the end plate of the movable scroll functions as a thrust bearing that abuts against the inner peripheral surface of the inner casing and receives the axial load of the movable scroll, a groove may be formed in the sliding surface formed on the back surface of the end plate of the movable scroll.

In addition, although the deep groove portions of the dynamic pressure generation mechanisms in the first to sixth embodiments have been described as being, for example, circular or rectangular, the present invention is not limited thereto and a polygonal shape such as a triangular shape and a pentagonal shape is preferable. It should be noted that in a case where the deep groove portion is not substantially line-symmetrical with reference to the virtual circular arc line along the sliding surface, as for the boundary between the deep groove portion and the communication passage, the deep groove is a region having a shape in which the maximum distance is equidistant with reference to the virtual circular arc line along the sliding surface passing through the center in the radial direction of the shallow groove portion and the region communicating with the deep groove is the communication passage.

In addition, although a configuration in which the shallow groove portion and the deep groove portion of the dynamic pressure generation mechanism communicate with each other over the part where the step is formed has been described in the first to sixth embodiments, the present invention is not limited thereto. The groove portions have only to communicate with each other at least in part. Accordingly, a configuration in which, for example, partial communication results from lands scattered between the shallow and deep groove portions may be used.

In addition, although the dynamic pressure generation mechanisms in the first to sixth embodiments have been described as a configuration in which the communication passage communicates with the back pressure chamber relatively higher in pressure than the low-pressure chamber, the present invention is not limited thereto and the communication passage may communicate with the low-pressure chamber.

REFERENCE SIGNS LIST

1 Housing
2 Rotary shaft
2a Eccentric portion
3 Inner casing
4 Scroll compression mechanism
6 Oil separator
7 Side seal (sliding component)
7a Sliding surface
8 Thrust plate
8a Sliding surface
10 Suction port
13 Discharge communication passage
14 Back pressure communication passage
15 Suction communication passage
20 Low-pressure chamber
30 High-pressure chamber
40 Compression chamber
41 Fixed scroll
42 Movable scroll
50 Back pressure chamber
70 Dynamic pressure generation mechanism
71 Shallow groove portion
72 Deep groove portion
73 Communication passage
74 Step
79 Land
107 to 507 Side seal (sliding component)
107a to 507a Sliding surface
170 to 570 Dynamic pressure generation mechanism
171 to 571 Shallow groove portion
172 to 572 Deep groove portion
173 to 573 Communication passage
C Scroll compressor
L1 Depth dimension
L2 Depth dimension
M Drive motor
P Center of dynamic pressure generation mechanism
Q Center of sliding surface

The invention claimed is:

1. A sliding component having an annular shape with a fluid facing inside and outside of the sliding component and having a sliding surface relatively sliding with eccentric rotation, wherein
the sliding surface includes a land and a plurality of dynamic pressure generation mechanisms arranged in a circumferential direction,
each dynamic pressure generation mechanism includes a shallow groove portion and a deep groove portion deeper than the shallow groove portion,
the shallow groove portion communicates with the deep groove portion,
a communication passage providing a communication between the deep groove portion and either an inside space or an outside space of the sliding component is formed in the sliding component,
in a plan view parallel to the sliding surface, an area of the deep groove portion is larger than an area of the communication passage, and
the shallow groove portion surrounds the deep groove portion in an annular shape.

2. The sliding component according to claim 1, wherein the communication passage communicates with the shallow groove portion.

3. The sliding component according to claim 1, wherein the communication passage is a groove formed in the sliding surface.

4. The sliding component according to claim 1, wherein the communication passage is a communication hole formed in the sliding component.

5. The sliding component according to claim 4, wherein the shallow groove portion surrounds an entire circumference of the deep groove portion.

6. A sliding component having an annular shape with a fluid facing inside and outside of the sliding component and having a sliding surface relatively sliding with eccentric rotation, wherein
the sliding surface includes a land and a plurality of dynamic pressure generation mechanisms arranged in a circumferential direction,
each dynamic pressure generation mechanism includes a shallow groove portion and a deep groove portion deeper than the shallow groove portion,
the shallow groove portion communicates with the deep groove portion,
a communication passage providing a communication between the deep groove portion and either an inside space or an outside space of the sliding component is formed in the sliding component,
in a plan view parallel to the sliding surface, an area of the deep groove portion is larger than an area of the communication passage,
the communication passage is a communication hole formed in the sliding component, and
the shallow groove portion surrounds an entire circumference of the deep groove portion.

7. The sliding component according to claim 6, wherein the communication passage communicates with the shallow groove portion.

8. A sliding component having an annular shape with a fluid facing inside and outside of the sliding component and having a sliding surface relatively sliding with eccentric rotation, wherein
the sliding surface includes a land and a plurality of dynamic pressure generation mechanisms arranged in a circumferential direction,
each dynamic pressure generation mechanism includes a shallow groove portion and a deep groove portion deeper than the shallow groove portion,
the shallow groove portion communicates with the deep groove portion,
a communication passage providing a communication between the deep groove portion and either an inside space or an outside space of the sliding component is formed in the sliding component,
the communication passage has a circumferential length smaller than a circumferential length of the deep groove portion, and
the shallow groove portion surrounds the deep groove portion in an annular shape.

9. The sliding component according to claim 8, wherein the communication passage is a groove formed in the sliding surface.

10. The sliding component according to claim 8, wherein the communication passage is a communication hole formed in the sliding component.

11. The sliding component according to claim 10, wherein the shallow groove portion surrounds an entire circumference of the deep groove portion.

12. The sliding component according to claim 8, wherein the communication passage communicates with the shallow groove portion.

13. The sliding component according to claim 8, wherein in a plan view parallel to the sliding surface, an area of the deep groove portion is larger than an area of the communication passage.

* * * * *